US00RE42999E

(19) United States
(12) Reissued Patent
LeClerc et al.

(10) Patent Number: US RE42,999 E
(45) Date of Reissued Patent: Dec. 6, 2011

(54) METHOD AND SYSTEM FOR ESTIMATING THE ACCURACY OF INFERENCE ALGORITHMS USING THE SELF-CONSISTENCY METHODOLOGY

(75) Inventors: Yvan G. LeClerc, Fremont, CA (US); Margaret Frances Davies, legal representative, Palo Alto, CA (US); Quang-Tuan Luong, San Jose, CA (US); Pascal Fua, Lausanne (CH)

(73) Assignee: Transpacific Kodex, LLC, Wilmington, DE (US)

(21) Appl. No.: 11/645,331

(22) Filed: Dec. 21, 2006

Related U.S. Patent Documents

Reissue of:
(64) Patent No.: 6,834,120
Issued: Dec. 21, 2004
Appl. No.: 09/714,345
Filed: Nov. 15, 2000

(51) Int. Cl.
*G06K 9/00* (2006.01)

(52) U.S. Cl. ..... 382/170; 358/3.01; 345/694

(58) Field of Classification Search ..... 382/168, 382/169, 170; 345/596, 690–697; 358/3.01–3.23
See application file for complete search history.

(56) References Cited

U.S. PATENT DOCUMENTS

| | | | | |
|---|---|---|---|---|
| 5,267,348 | A * | 11/1993 | Someya et al. | 706/52 |
| 5,664,027 | A * | 9/1997 | Ittner | 382/170 |
| 5,742,704 | A * | 4/1998 | Suzuki et al. | 382/176 |
| 5,819,259 | A * | 10/1998 | Duke-Moran et al. | 707/3 |
| 6,014,453 | A * | 1/2000 | Sonoda et al. | 382/137 |
| 6,125,208 | A * | 9/2000 | Maier et al. | 382/228 |
| 6,262,730 | B1 * | 7/2001 | Horvitz et al. | 715/707 |
| 6,307,963 | B1 * | 10/2001 | Nishida et al. | 382/190 |
| 6,330,360 | B1 * | 12/2001 | Saito | 382/202 |
| 6,380,934 | B1 * | 4/2002 | Freeman et al. | 345/419 |
| 2002/0157116 | A1 * | 10/2002 | Jasinschi | 725/136 |
| 2002/0180805 | A1 * | 12/2002 | Chickering et al. | 345/812 |

* cited by examiner

*Primary Examiner* — Anand Bhatnagar
(74) *Attorney, Agent, or Firm* — Snell & Wilmer L.L.P.

(57) ABSTRACT

The present invention provides a method for measuring the self-consistency of inference algorithms. The present invention provides a method for measuring the accuracy of an inference algorithm that does not require comparison to ground truth. Rather, the present invention pertains to a method for measuring the accuracy of an inference algorithm by comparing the outputs of the inference algorithm against each other. Essentially, the present invention looks at how well the algorithm applied to many of the different observations gives the same answer. In particular, the present invention provides a method that is not time and labor intensive and is cost effective.

39 Claims, 12 Drawing Sheets

METHOD AND SYSTEM FOR ESTIMATING THE ACCURACY OF INFERENCE ALGORITHMS USING THE SELF-CONSISTENCY METHODOLOGY

Matter enclosed in heavy brackets [ ] appears in the original patent but forms no part of this reissue specification; matter printed in italics indicates the additions made by reissue.

*The invention was made with Government support under contract number F33615-97-C-1023 awarded by the Defense Advance Research Projects Agency. The Government has certain rights in this invention.*

FIELD OF INVENTION

The present invention relates to the field of inference algorithms.

BACKGROUND OF THE INVENTION

An inference algorithm is any algorithm that takes input observations from the world and makes inferences about the causes of those observations. Different types of inference algorithms are stereo algorithms and computer vision algorithms. Inference algorithms are used in several areas including three-dimensional imaging and voice recognition and natural language understanding. As technology utilizing inference algorithms advances, methods for determining the accuracy of these algorithms is essential. Accuracy determinations are based on statistical characterizations of the performance of the algorithm.

One possible statistical characterization of the performance of an inference algorithm is in terms of the error of the matches compared to "ground truth." Comparison with ground truth requires the build up a corpus of ground truth observations and training the algorithm based on the corpus. If sufficient quantities of ground truth are available estimating the distribution of errors over many image pairs of many scenes is relatively straight forward. This distribution could then be used as a prediction of the accuracy of matches in new images.

The comparison to ground truth, however, has several drawbacks. Acquiring ground truth for any scene is an expensive and problematic proposition, as several observations must be recorded. Also, aquiring ground truth for any scene is extremely time and labor intensive. Furthermore, any ground truth measurements are subject to discrepancies in the measurements, therefore reducing the accuracy of the performance.

Accordingly, a need exists for a method for measuring the accuracy of an inference algorithm that does not require comparison to ground truth. A need exists for a method that can satisfy the above need and that is not time and labor intensive. Furthermore, a need exists for a method that can satisfy the above needs and that is cost effective and not overly expensive.

SUMMARY OF THE INVENTION

The present invention provides a method for measuring the self-consistency of inference algorithms. The present invention provides a method for measuring the accuracy of an inference algorithm that does not require comparison to ground truth. Rather, the present invention pertains to a method for measuring the accuracy of an inference algorithm by comparing the outputs of the inference algorithm against each other. Essentially, the present invention looks at how well the algorithm applied to many of the different observations gives the same answer. In particular, the present invention provides a method that is not time and labor intensive and is cost effective.

In the present embodiment, the present invention pertains to a method for estimating the accuracy of inference algorithms using self-consistency methodology. Self-consistency methodology relies on the outputs of an inference algorithm independently applied to different sets of views of a static scene to estimate the accuracy of every element of the output of the algorithm for a given set of views. An algorithm consistent across many different observations of the same thing is a self-consistent algorithm. By using self-consistency methodology, the output is compared against itself over many different observations. An algorithm is self-consistent where it gives the same answer when applied to many observations.

In the present embodiment, the algorithm is applied to many different observations of the same static scene. The observations are then compared to each other in a manner that is a function of the exact nature of the observation and the inferences made. A statistical analysis of the self-consistency is then made which is used to fine-tune an algorithm or compare different algorithms.

In one embodiment of the present invention, the internal parameters of the algorithm are adjusted after each comparison to make the inference algorithm more and more consistent. This is useful for fine-tuning an algorithm to increase its effectiveness and accuracy.

In another embodiment of the present invention, different inference algorithms may be compared against each other over a number of observations. This is useful for determining whether one algorithm is more effective or accurate than another algorithm. This is also useful for determining when one algorithm is better than another algorithm.

These and other objects and advantages of the present invention will become obvious to those of ordinary skill in the art after having read the following detailed description of the preferred embodiments which are illustrated in the various drawing figures.

DETAILED DESCRIPTION

Figure 1:
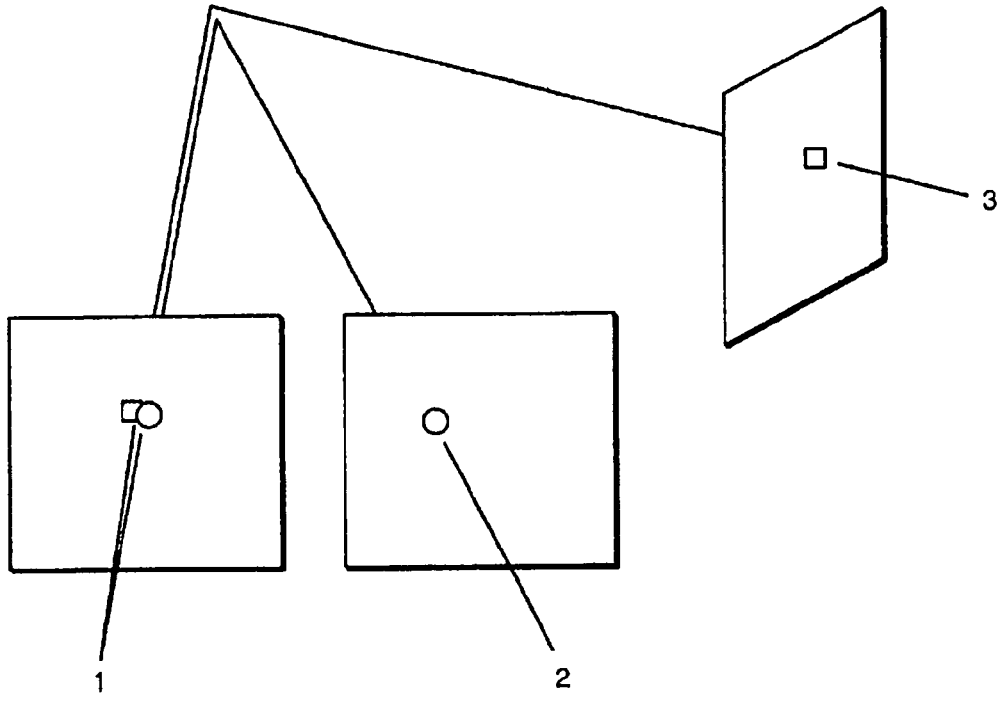
FIG. 1 is a perspective view of a common-point match set.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

I. A METHOD FOR MEASURING THE ACCURACY OF INFERENCE ALGORITHMS USING THE SELF-CONSISTENCY METHODOLOGY

A new approach to characterizing the performance of point-correspondence algorithms by automatically estimating the reliability of hypotheses (inferred from observations of a "scene") by certain classes of algorithms is presented. It should be appreciated that the term "scene" refers not only to visual scenes, but to the generic scene. (e.g. anything that so can be observed—audio observations for voice recognition purposes). An example is an algorithm that infers the 3-D shape of an object (i.e., a collection of hypotheses about the world) from a stereo image pair (the observation of the scene). Instead of relying on any "ground truth" it uses the self-consistency of the outputs of an algorithm independently applied to different sets of views of a static scene. It allows one to evaluate algorithms for a given class of scenes, as well as to estimate the accuracy of every element of the output of the algorithm for a given set of views. Experiments to demonstrate the usefulness of the methodology are presented.

1. INTRODUCTION

The human visual system exhibits the property of self-consistency: given a static natural scene, the perceptual inferences made from one viewpoint are almost always consistent with the inferences made from a different viewpoint. The first step towards the goal of designing self-consistent computer vision algorithms is to measure the self-consistency of the influences of the current computer vision algorithm over many scenes. An important refinement of this is to measure the self-consistency of subsets of an algorithm's inferences that satisfy certain measurable criteria, such as having "high confidence."

Once the self-consistency of the algorithm can be measured, and it is observed that this measure remains reasonably constant over many scenes (at least for certain subsets), then it is reasonably confident that the algorithm will be self-consistent over new scenes. More importantly, such algorithms are also likely to exhibit the self-consistency property of the human visual system: given a single view of a new scene, such an algorithm is likely to produce inferences that would be self-consistent with other views of the scene should they become available later. This, measuring self-consistency is a critical step towards discovering (and eventually designing) self-consistent algorithms. It could also be used to learn the parameters of an algorithm that leads to self-consistency.

It must be appreciated that self-consistency is a necessary, but not sufficient, condition for a computer vision algorithm to be correct. That is, it is possible (in principle) for a computer vision algorithm to be self-consistent over many scenes but be severely biased or entirely wrong. It is conjectured that this cannot be the case for non-trivial algorithms. If bias can be ruled out, then the self-consistency distribution becomes a measure of the accuracy of an algorithm—one which requires no "ground truth." Also, self-consistency must be measured over a wide variety of scenes to be a useful predictor of self-consistency over new scenes. In practice, one can measure self-consistency over certain classes of scenes, such as close-up views of faces or aerial images of natural terrain.

2. A FORMALIZATION OF SELF-CONSISTENCY

A simple formalization of a computer vision algorithm as a function that takes an observation Ω of a world W as input produces a set of hypotheses H about the world as output:

$$H-(h_1, h_2, \ldots, h_n)=F(\Omega, W).$$

An observation Ω is one or more images of the world taken at the same time, perhaps accompanied by meta-data, such as the time the image(s) was acquired, the internal and external camera parameters, and their covariances. It should be appreciated that this example is applicable to observations other than images, but also to anything that can be observed (e.g. audio observations for voice recognition purposes). A hypothesis h nominally refers to some aspect or element of the world (as opposed to some aspect of the observation), and it normally estimates some attribute of the element it refers to. This is formalized with the following set of functions that depend both on F and Ω:

a) Ref(h), the referent of the hypothesis h (e.g. which element in the world that the hypothesis refers to).
b) R(h, h')=Prob(Ref(h)=Ref(h'), an estimate of the probability that the two hypotheses h and h' (computed from two observations of the same world) refer to the same object or process in the world.
c) Att(h), an estimate of some well-defined attribute of the referent.
d) Ac(h), an estimate of the accuracy distribution of Att(h). When this is well-modeled by a normal distribution it can be represented implicitly by its covariance, Cov(h).
e) Score(h), an estimate of the confidence that Att(h) is correct.

Intuitively, two hypotheses h and h', derived from observation Ω and Ω' of a static world W, are consistent with each other if they both refer to the same object in the world and the difference in their estimated attributes is small relative to their accuracies, or if they do not refer to the same object. When the accuracy is well modeled by a normal distribution the consistency of the two hypotheses, C(h, h') can be written as $$C(h, h')=R(h, h'(Att(h)-Att(h'))^T(Cov(h)+Cov(h')^{-1}(Att(h)-Att(h'))^T$$

Note that the second term on the right is the Mahalanobis distance between the attributes which is referred to as the normalized distance between attributes. Given the above, the self consistency of an algorithm can be measured as the histogram of C(h, h') over all pairs of hypotheses in H=F(Ω(W) and H'=F(ΩC(h, h')(W) over all observations over all suitable static worlds W. This distribution of C(h, h') is called the self-consistency distribution of the computer vision algorithm F over the worlds W. To simplify the exposition below, the distribution for only pairs h and h' are calculated for which R(h, h') is about equal to 1. It is essential to appreciate that this methodology is applicable to many classes of computer vision algorithms, and not only to stereo algorithms.

Once established, the above functions can be used to estimate the self-consistency of the algorithm, as follows:

a) Collecting many observations of a static scene W. This is done for many static scenes that are within some well-define class of scenes and observation conditions.
b) The algorithm is applied to each observation of W.
c) For every hypothesis h(W) and h'(W') for which R(h,h') is close to 1, increment the histogram of (Att(h)−Att (h')) normalized by Acc(h) and Acc(h') (an example is the Mahalanobis distance: $(Att(h)-Att(h'))^T(Cov(h)+Cov(h'))^{-1}(Att(h)-Att(h')))$. The histogram can be conditionalized on Score(h) and Score(h').

The resulting histogram, or self-consistency distribution, is an estimate of the reliability of the algorithm's hypotheses, conditionalized by the score of the hypotheses (and also implicitly conditionalized by the class of scenes and observation conditions). When this distribution remains approximately constant over many scenes (within a given class) then this distribution can be used as a prediction of the reliability of that algorithm applied to just one observation of a new scene.

What makes the self-consistency methodology unique is that it takes into account all of the complex interactions between the algorithm, observations, and class of scenes. These interactions are typically too complex to model directly, or even approximately. This usually means that there exists no good estimate of an algorithm's reliability, except for that provided by self-consistency.

The self-consistency methodology presented in the present invention is useful in many fields. For one, it is very useful for any practitioner of computer vision or artificial intelligence that needs an estimate of the reliability of a given inference algorithm applied to a given class of scenes. Also, the self-consistency methodology can be used to eliminate unreliable hypotheses, optimally combine the remaining hypotheses into a more accurate hypothesis (per referent), and clearly identify places where combined hypotheses are insufficiently accurate for some stated purpose. For example, there is a strong need from both civilian and military organizations to estimate the 3-D shape of terrain from aerial images. Current techniques require large amounts of manual editing, with no guarantee of the resulting product. The methodology could be used to produce more accurate shape models by optimally combining hypotheses, as stated above, and to identify places where manual editing is required.

The self-consistency methodology has a significant advantage over the prior art use of ground truth because the establishment of sufficient quantities of highly accurate and reliable ground truth to estimate reliability is prohibitively expensive, whereas minimal effort beyond data gathering is required for applying the self-consistency methodology

3. SELF-CONSISTENCY AND STEREO ALGORITHMS

The above self-consistency formalism can be applied to stereo algorithms. It is assumed that the projection matrices and associated covariances are known for all images.

The hypothesis h produced by a traditional stereo algorithm is a pair of image coordinates $(x_0, x_1)$ in each of two images, $(I_0, I_1)$. In its simplest form a stereo match hypothesis h asserts that the closest opaque surface element along the optic ray through $x_1$. That is, the referent of h, Ref(h), is the closest opaque surface element along the optic rays through both $x_0$ and $x_1$.

Consequently, two stereo hypotheses have the same referent if their image coordinates are the same in one image. In other words, if there is a match in image pair and a match in image pair then the stereo algorithm is asserting that they refer to the same opaque surface element when the coordinates of the matches in Image I1 are the same. Self-consistency, in this case, is a measure of how often (and to what extent) this assertion is true.

The above observation can be used to write the following set of associated functions for a stereo algorithm. It is assumed that all matches are accurate to within some nominal accuracy $\sigma$, in pixels (typically $\sigma=1$). This can be extended to include the full covariance of the match coordinates.

a) Ref(h), the closest opaque surface element visible along the optic rays through the match points.
b) R(h, h')=1 if h and h' have the same coordinate (within $\sigma$) in one image, 0 otherwise.
c) Atn(h), the triangulated 3D (or projective) coordinates of the surface element.
d) Acc(h), the covariance of Att(h), given that the match coordinates are $N(x_0, \sigma)$ and $N(x_0, \sigma)$ random variables.
e) Score(h), a measure such as normalized cross-correlation or sum of squared differences.

In this case, the self-consistency distribution is the histogram of normalized differences in triangulated 3D points for pairs of matches with a common point in one image.

4. THE SELF-CONSISTENCY DISTRIBUTION 4.1. A METHODOLOGY FOR ESTIMATING THE SELF-CONSISTENCY DISTRIBUTION

Ideally, the self-consistency distribution should be computed using all possible variations of viewpoint and camera parameters (within some class of variations) over all possible scenes (within some class of scenes). However, an estimate of the distribution can be computed using some small number of images of a scene, and an average distribution over many scenes.

Initially, a fixed collection of images assumed to have been taken at exactly the same time (or, equivalently, a collection of images of a static scene taken over time). Each image has a unique index and associated projection matrix and (optionally) projection covariances, which are supposed to be known. The projection matrix describes the projective linear relationship between the three-dimensional coordinates of a point in a common coordinate system, and its projection on an image. It should be appreciated that although the methodology is easier to apply when the coordinate system is Euclidean, the minimal requirement is that the set of projection matrices be a common projective coordinate system.

A stereo algorithm is then applied independently to all pairs of images in this collection. It should be appreciated that stereo algorithms can find matches in n >2 images. In this case, the algorithm would be applied to all subsets of size n. Here n=2 is used only to simplify the presentation. Each such pair of images is an observation in the above formalism. The output of a point correspondence algorithm is a set of matches of two-dimensional point and, optionally, a score that represents a measure of the algorithm's confidence in the corresponding match. The score would have a low value when the match is certain and a high value when the match is uncertain. The image indices, match coordinates and score are reported in match files for each image pair.

The match files are searched for pairs of matches that have the same coordinate in one image. For example, as illustrated in FIG. 1, a match is derived from images 1 and 2, another match is derived from images 1 and 3, and these two matches have the same coordinate in image 1, then these two matches have the same referent. Such a pair of matches, which is called a common-point match set, should be self-consistent because they should correspond to the same point in the world. This extends the principle of the trinocular stereo constraint to arbitrary camera configurations and multiple images.

Given two matches in a common-point match set, the distance between the triangulations can now be computed after normalizing for the camera configurations. The histogram of these normalized differences, computed over all common-point matches, is the estimate of the self-consistency distribution.

4.2. AN EXAMPLE OF THE SELF-CONSISTENCY DISTRIBUTION

To illustrate the self-consistency distribution, the above methodology is first applied to the output of a simple stereo algorithm. The algorithm first rectifies the input pair of images and then searches for 7×7 windows along scan lines that maximize a normalized cross-correlation metric. Subpixel accuracy is achieved by fitting a quadratic to the metric evaluated at the pixel and its two adjacent neighbors. The algorithm first computes the match by comparing the left image against the right and then comparing the right image against the left. Matches that are not consistent between the two searches are eliminated. Note that this is a way of using self-consistency as a filter.

Figure 2A:
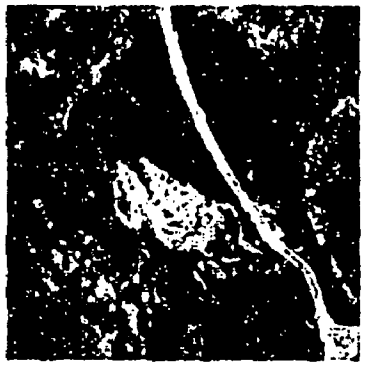
FIG. 2(a) illustrates a sample scene of an aerial view of terrain.

The stereo algorithm was applied to all pairs of five aerial images of bare terrain, one of which is illustrated in FIG. 2(a). These images are actually small windows from much larger images (about 9000 pixels on a side) for which precise ground control and bundle adjustment were applied to get accurate camera parameters. Because the scene depicted in FIG. 2(a) consisted of bare, relatively smooth terrain with little vegetation, it would be expected that the stereo algorithm described would perform well. This expectation is confirmed anecdotally by visually inspecting the matches.

However, a quantitative estimated for the accuracy of the algorithm for this scene may be achieved by computing the self-consistency distribution of the output of the algorithm applied to the ten images pairs in this collection. FIGS. 2(c) and 2(d) show two versions of the distribution. The solid curve is the probability density (the probability that the normalized distance equals x). It is useful for seeing the mode and the general shape of the distribution. The dashed curve is the cumulative probability distribution (the probability that the normalized distance is less than x). It is useful for seeing the median of the distribution (the point where the curve reaches 0.5) or the fraction of match pairs with normalized distances exceeding some value.

In this example (FIG. 2(c)), the self-consistency distribution shows that the mode is about 0.5, about 95% of the normalized distances are below 1, and that about 2% of the match pairs have normalized distances above 10.

Figure 2B:
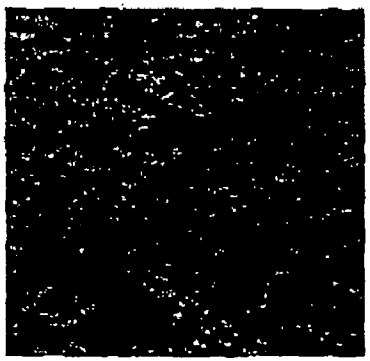
FIG. 2(b) illustrates a sample scene of an aerial view of a tree canopy.
Figure 2C:
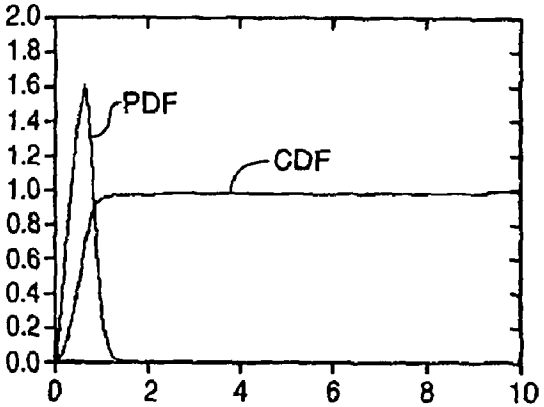
FIG. 2(c) is a graphical representation of a self-consistency distribution for an image of an aerial view of terrain.
Figure 2D:
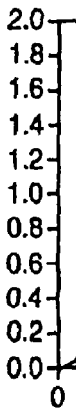
FIG. 2(d) is a graphical representation of a self-consistency distribution for an image of an aerial view of a tree canopy.

In FIG. 2(d), the self-consistency distribution is shown for the same algorithm applied to all pairs of five aerial images of a tree canopy, one of which is illustrated in FIG. 2(b). Such scenes are notoriously difficult for stereo algorithms. Visual inspection of the output of the stereo algorithm confirms that most matches are quite wrong. This can be quantified using the self-consistency distribution in FIG. 2(d). It is seen that, although the mode of the distribution is still about 0.5, only 10% of the matches have a normalized distance of less than 1, and only 42% of the matches have a normalized distance of less than 10.

Note that the distributions illustrated above are not well modeled using Gaussian distributions because of the predominance of outliers (especially in the tree canopy example). This is why it is more appropriate to compute the full distribution rather than use its variance as a summary.

4.3. CONDITIONALIZATION

Figure 2E:
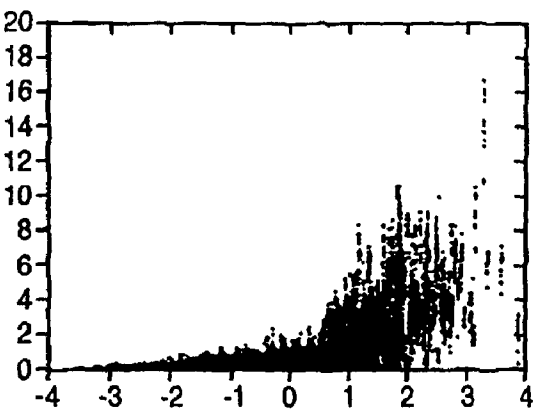
FIG. 2(e) is a graphical representation of a score dependent scatter diagram for an image of an aerial view of terrain.
Figure 2F:
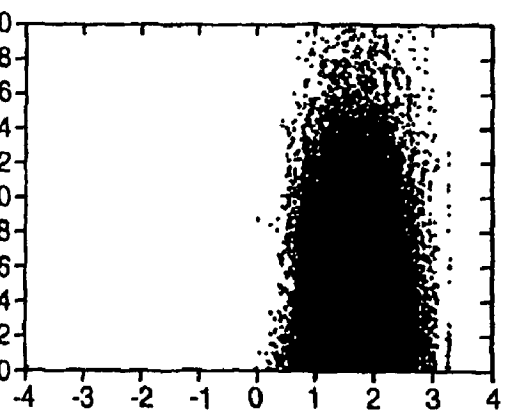
FIG. 2(f) is a graphical representation of a score dependent scatter diagram for an image of an aerial view of a tree canopy.

The global self-consistency distribution, while useful, is only a weak estimate of the accuracy of the algorithm. This is clear from the above examples, in which the unconditional self-consistency distribution varied considerably from one scene to the next. However, the self-consistency distribution for matches having a given "score" can be computed. This is illustrated in FIGS. 2(e) and 2(f) using a scatter diagram. The scatter diagram shows a point for every pair of matches, the x coordinate being the normalized distance between the matches.

There are several points to note about the scatter diagrams. First, the terrain example (FIGS. 2(a), 2(c), and 2(e)) shows that most points with scores below 0 have normalized distances less than about 1. Second, most of the points in the tree canopy example (FIGS. 2(b), 2(d), and 2(f)) are not self-consistent. Third, none of the points in the tree canopy example have scores below zero. Thus, it would seem that this score is able to segregate self-consistent matches from non-self-consistent matches, even where the scenes are radically different.

5. PROJECT NORMALIZATION

To apply the self-consistency method to a set of images all that is needed is a set of projection matrices in a common projective coordinate system. This can be obtained from point correspondences using projective bundle adjustment and does not require camera calibration. The Euclidean distance is not invariant to the choice of projective coordinates, but this dependence can often be reduced by using the normalization described below. Another way to do so, which actually cancels the dependence on the choice of projective coordinates, is to compute the difference between the reprojections instead of the triangulations. This, however, does not cancel the dependence on the relative geometry of the cameras.

5.1 THE MAHALANOBIS DISTANCE

Assuming that the contribution of each individual match to the statistics is the same ignores many imaging factors like the geometric configuration of the cameras and their resolution, or the distance of the 3D point from the cameras. The way to take into account all of these factors is to apply a normalization which makes the statistics invariant to these imaging factors. In addition, this mechanism makes it possible to take into account the uncertainty in camera parameters by including them into the observation parameters.

It is assumed that the observation error (due to image noise and digitalization effects) is Gaussian. This makes it possible to compute the covariance of the reconstruction given the covariance of the observations. Considering two reconstructed estimates of a 3-D point, $M_1$ and $M_2$ to be compared, and their computed covariance matrices $\Lambda_1$ and $\Lambda_2$. The squared Euclidean distance between $M_1$ and $M_2$ is weighed by the sum of their covariances. This yields the Mahalanobis distance: $(M_1-M_2)^T(\Lambda_1-\Lambda_2)^{-1}(M_1-M_2)$.

5.2 DETERMINING THE RECONSTRUCTION AND REPROJECTION COVARIANCES

If the measurements are modeled by the random vector x, of mean $x_0$ and of covariance $\Lambda_x$, then the vector $y=f(x)$ is a random vector of mean is $f(x_0)$ and, up to the first order, covariance $J_f(x_0)\Lambda_x J_f(x_0)^T$, where $J_f(x_0)$ is the Jacobian matrix of f, at the point $x_0$.

In order to determine the 3-D distribution error in reconstruction, the vector x is defined by concatenating the 2-D coordinates of each point of the match, e.g. $[x_1; y_1; x_2; y_2; \ldots x_n; y_n]$ and the result of the function is the 3-D coordinates X, Y, Z of the point M reconstructed from the match, in the least-squares sense. The key is that M is expressed by a closed-form formula of the form $M=(L^TL)^{31}\ {}_1L^Tb$, where L and b are a matrix and vector which depend on the projection matrices and coordinates of the points in the match. This makes it possible to obtain the derivatives of M with respect to the 2n measurements $w_i$; i=1. . . n; w=x, y. It is also assumed that the errors at each pixel are independent, uniform and isotropic. The covariance matrix $\Lambda_x$ is then diagonal, therefore each element of $\Lambda_M$ can be computed as a sum of independent terms for each image.

The above calculations are exact when the mapping between the vector of coordinates of $m_i$ and M(respectively $m'_j$ and M') is linear, since it is only in that case that the distribution of M and M' is Gaussian. The reconstruction operation is exactly linear only when the projection matrices are affine. However, the linear approximation is expected to remain reasonable under normal viewing conditions, and to break down only when the projection matrices are in configurations with strong perspective.

6. EXPERIMENTS 6.1 SYNTHETIC DATA

In order to gain insight into the nature of the normalized self-consistency distributions, the case when the noise in point localization is Gaussian is investigated. First, the analytical model for the self-consistency distribution in that case is derived. Then it is shown, using monte-carlo experiments that, provided that the geometrical normalization described above is used, the experimental self-consistency distributions fit this model quite well when perspective effects are not strong. A consequence of this result is that under the hypothesis that the error localization of the features in the images is Gaussian, the self-consistency distribution could be used to recover exactly the accuracy distribution.

MODELING THE GAUSSIAN SELF-CONSISTENCY DISTRIBUTIONS

The squared Mahalanobis distance in 3D follows a chi-square distribution with three degrees of freedom:

$$\chi_3^2 = \frac{1}{\sqrt{2\pi}}\sqrt{\chi}\, e^{-x/2}$$

In the present invention, the Mahalanobis distance is computed between M, M', reconstructions in 3D, which are obtained from matches $m_i$, $m'_j$ of which coordinates are assumed to be Gaussian, zero-mean and with standard deviation a. If M, M' are obtained from the coordinates $m_i$, $m'_j$ with a linear transformation A, A', then the covariances are $\sigma^2 AA^T$, $\sigma^2 A'A'^T$. The Mahalanobis distance follows the distribution:

$$d_3 = x^2/\sigma^3\sqrt{2/\pi}\, e^{-x^2/2\sigma^2} \tag{1}$$

Using the Mahalanobis distance, the self-consistency distributions should be statistically independent of the 3D points and projection matrices. Of course, if just the Euclidean distance was used, there would be no reason to expect such an independence.

COMPARISON OF THE NORMALIZED AND UNNORALIZED DISTRIBUTIONS

To explore the domain of validity of the first-order approximation to the covariance, three methods to generate random projection matrices have been considered:

1. General projection matrices are picked randomly.
2. Projection matrices are obtained by perturbing a fixed, realistic matrix (which is close to affine). Entries of this matrix are each varied randomly within 500% of the initial value.
3. Affine projection matrices are picked randomly.

Each experiment in a set consisted of picking random 3D points, random projection matrices according to the configuration previously described, projecting them, adding random Gaussian noise to the matches, and computing the self-consistency distributions by labeling the matches so that they are perfect.

Figure 3:
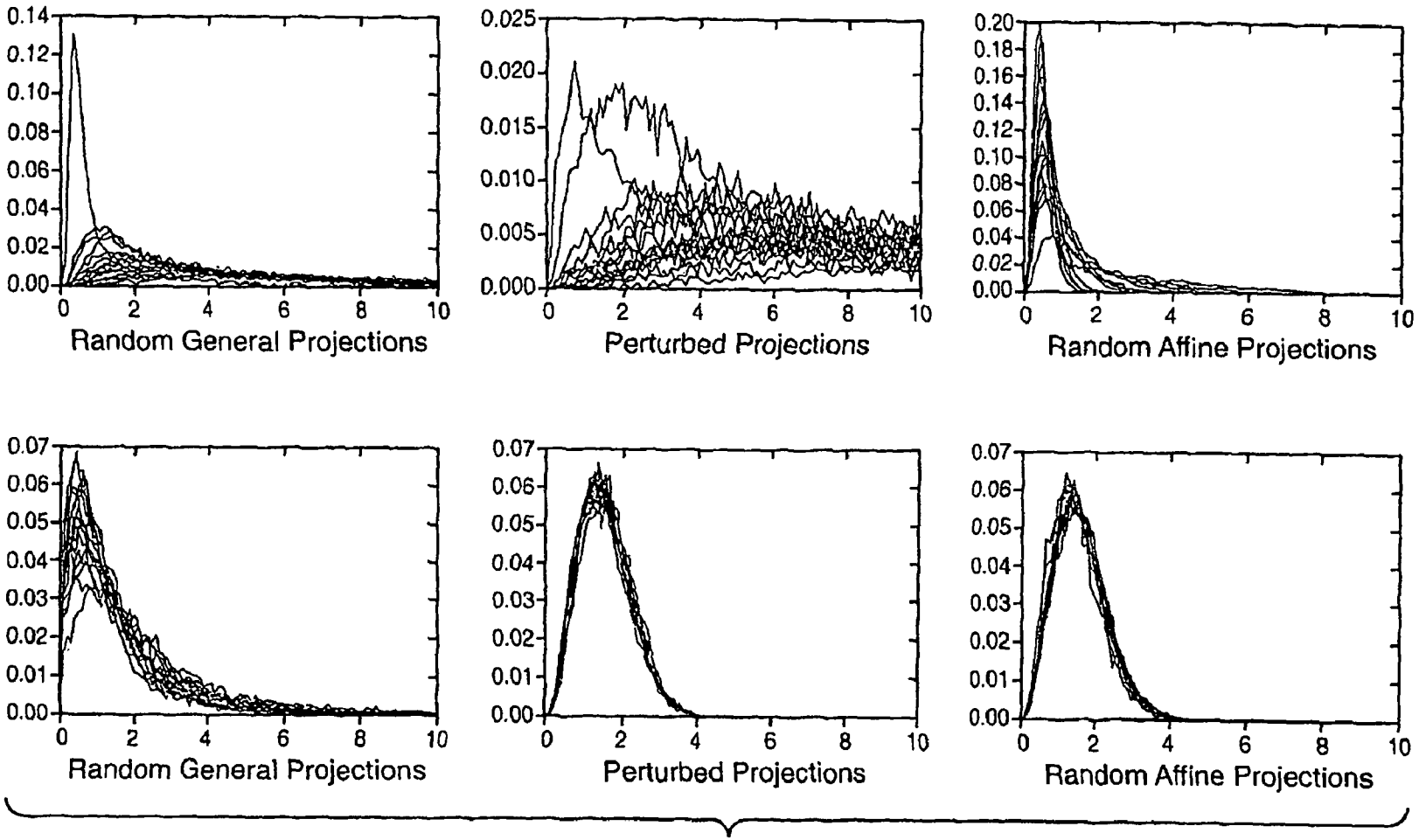
FIG. 3 illustrates six graphical representations of simulations comparing un-normalized versus normalized self-consistency distributions.

To illustrate the invariance of the distribution that can be obtained using the normalization, experiments were performed where both the normalized version and the unnormalized version of the self-consistency were computed. As illustrated in FIG. 3, using the normalization reduced dramatically the spread of the self-consistency curves found within each experiment in a set. In particular, in the two last configurations, the resulting spread was very small, which indicates that the geometrical normalization was successful at achieving invariance with respect to 3D points and projection matrices.

COMPARISON OF THE EXPERIMENTAL AND THEORETICAL DISTRIBUTIONS

Figure 4:
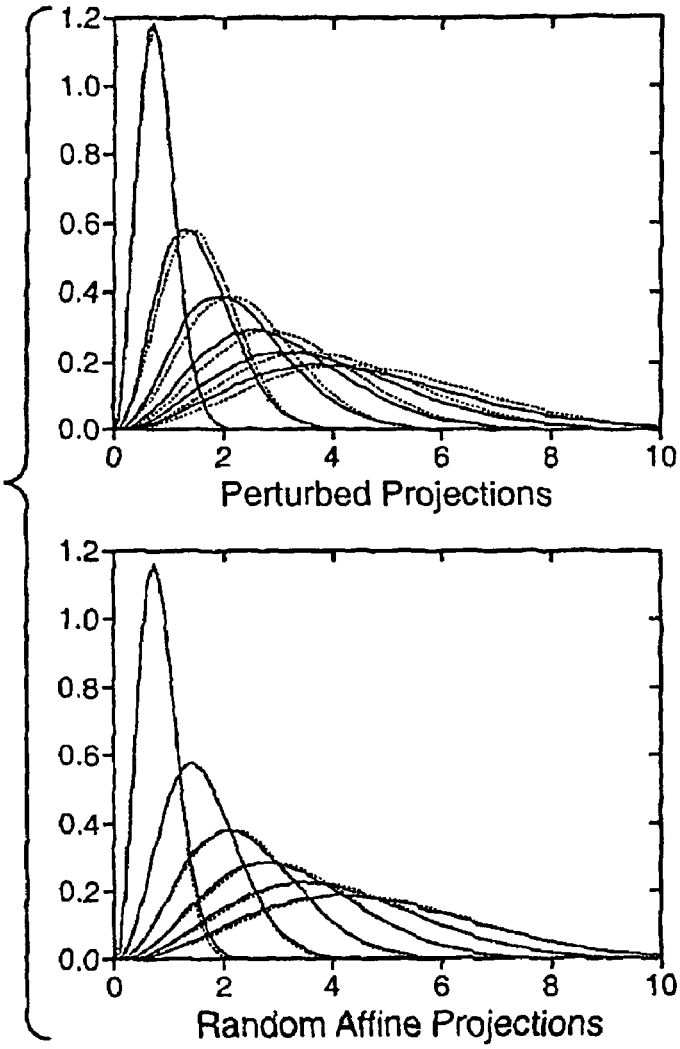
FIG. 4 illustrates two graphical representations of simulations comparing averaged theoretical and experimental curves.

Using the Mahalanobis distance, the density curves within each set of experiments is then averaged, and tried to fit the model described in Equation 1 above to the resulting curves, for six different values of the standard deviation, $\sigma$=0.5, 1, 1.5, 2, 2.5, 3. As illustrated in FIG. 4, the model describes the average self-consistency curves very well when the projection matrices are affine (as expected from the theory), but also when they are obtained by perturbation of a fixed matrix. When the projection matrices are picked totally at random, the model does not describe the curves very well, but the different self-consistency curves corresponding to each noise level are still distinguishable.

6.2 COMPARING TWO ALGORITHMS

The experiments described here and in the following section are based on the application of stereo algorithms to seventeen scenes, each comprising five images, for a total of 85 images and 170 image pairs. At the highest resolution, each image is a window of about 900 pixels on a side from images of about 9000 pixels on a side. Some of the experiments were done on gaussian-reduced versions of the images. These images were controlled and bundle-adjusted to provide accurate camera parameters.

A single self-consistency distribution for each algorithm was created by merging the scatter data for that algorithm across all seventeen scenes. Previous two algorithms have been compared, but using data from only four images. By merging the scatter data as done here, it is now possible to compare algorithms using data from many scenes. This results in a much more comprehensive comparison.

Figure 5:
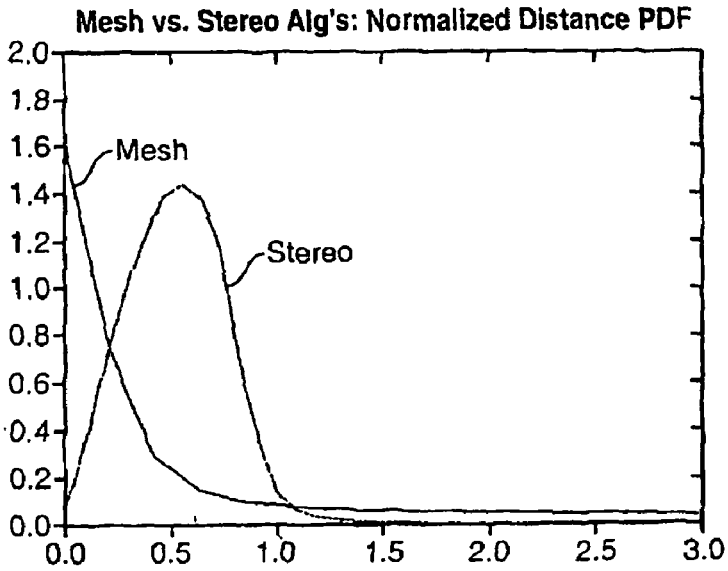
FIG. 5 illustrates a graphical representation of the merged distributions for a deformable mesh algorithm and a stereo algorithm.

The merged distributions are shown in FIG. 5 as probability density functions for the two algorithms. The solid curve represents the distribution for the deformable mesh algorithm, and the dashed curve represents the distribution for the stereo algorithm described above.

Comparing these two graphs shows some interesting differences between the two algorithms. The deformable mesh algorithm clearly has more outliers (matches with normalized distances above 1), but has a much greater proportion of matches with distances below 0.25. This is not unexpected since the strength of the deformable meshes is its ability to do very precise matching between images. However, the algorithm can get stuck in local minima. Self-consistency now allows us to quantify how often this happens.

But this comparison also illustrates that one must be very careful when comparing algorithms or assessing the accuracy of a given algorithm. The distributions are very much dependent on the scenes being used (as would also be the case if comparing the algorithms against ground truth—the "gold standard" for assessing the accuracy of a stereo algorithm). In general, the distributions will be most useful if they are derived from a well-defined class of scenes. It might also be necessary to restrict the imaging conditions (such as resolution or lighting) as well, depending on the algorithm. Only then can the distribution be used to predict the accuracy of the algorithm when applied to images of similar scenes.

6.3 COMPARING THREE SCORING FUNCTIONS

To eliminate the dependency on scene content, it is proposed to use a score associated with each match. The scatter diagrams in FIGS. 2(e) and 2(f) illustrated how a scoring function might be used to segregate matches according to their expected self-consistency.

Figure 6:
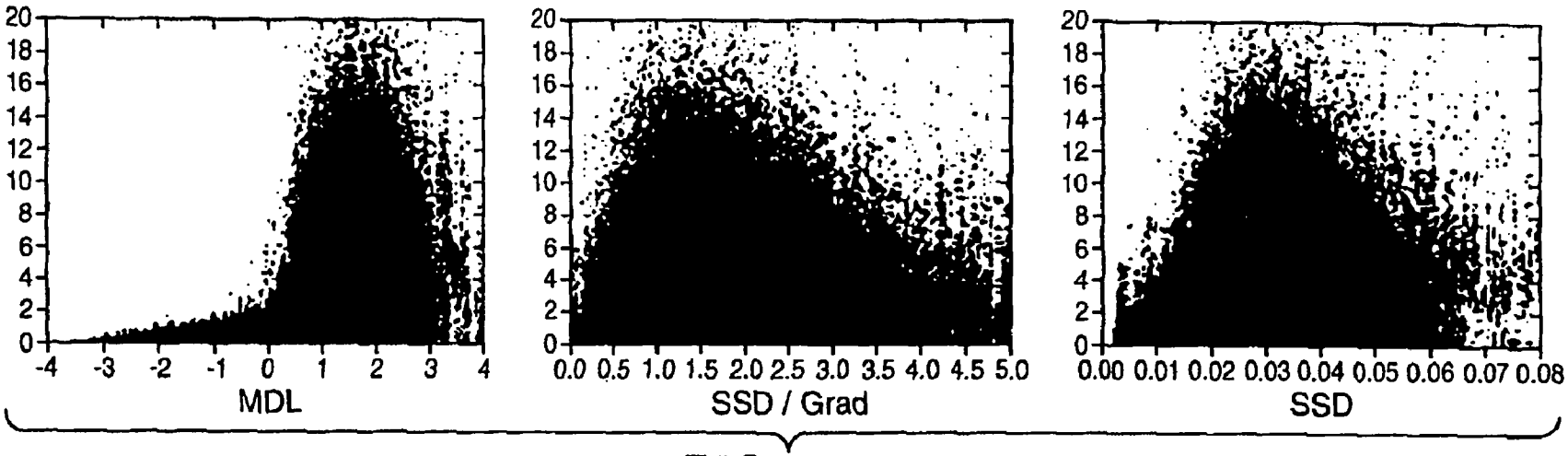
FIG. 6 illustrates three graphical representations of scatter diagrams for different scores.

In this section three scoring functions will be compared, one based on Minimum Description Length Theory (the MDL score—see Part II, Section 2.3, infra), the traditional sum-of-squared-differences (SSD) score, and the SSD score normalized by the localization covariance (SSD/GRAD score). All scores were computed using the same matches computed by the deformable mesh algorithm applied to all image pairs of the seventeen scenes mentioned above. The scatter diagrams for all of the areas were then merged together to produce the scatter diagrams show in FIG. 6. The MDL score has the very nice property that the confidence interval (as defined earlier) rises monotonically with the score, at least until there is a paucity of data, when then score is greater than 2. It also has a broad range of scores (those below zero) for which the normalized distances are below 1, with far fewer outliers than the other scores.

The SSD/GRAD score also increases monotonically (with perhaps a shallow dip for small values of the score), but only over a small range. The traditional SSD score, on the other hand, is distinctly not monotonic. It is fairly non-self-consistent for small scores, then becomes more self-consistent, and then rises again.

6.4 COMPARING WINDOW SIZE

Figure 7:
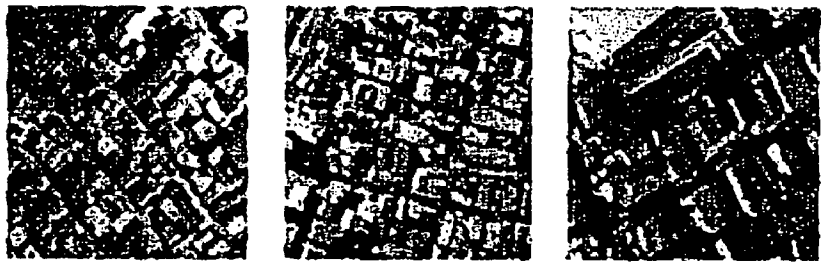
FIG. 7 illustrates three depictions of urban scenes.
Figure 8A:
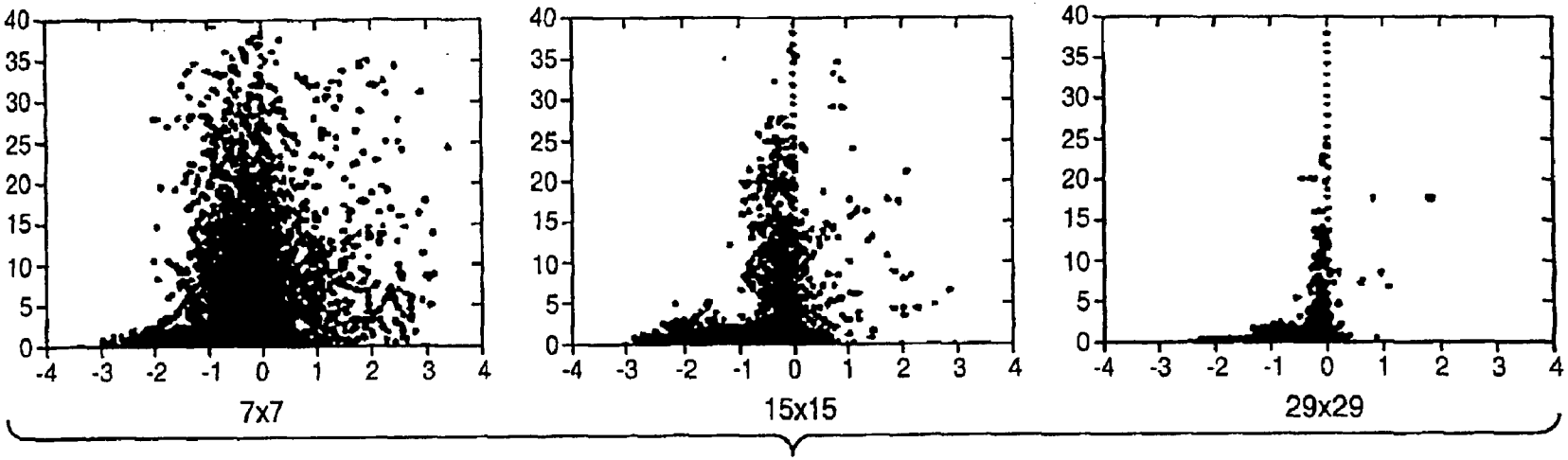
FIG. 8(a) illustrates three graphical representations of the combined self-consistency distributions of six urban scenes.
Figure 8B:
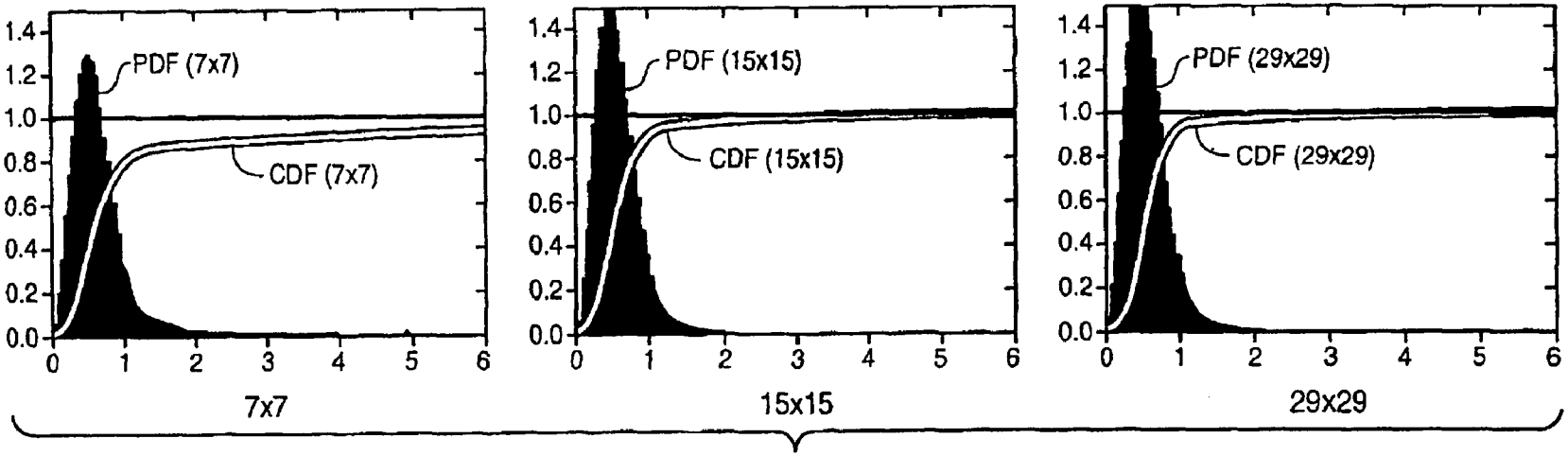
FIG. 8(b) illustrates three graphical representations of the scatter diagrams for the MDL score of six urban scenes.
Figure 9A:
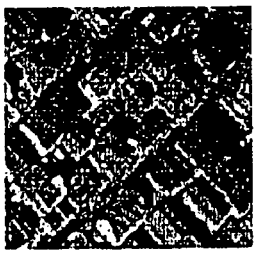
FIG. 9(a) illustrates one images of a scene at time $t_1$
Figure 9B:
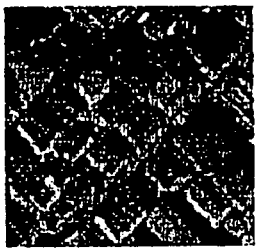
FIG. 9(b) illustrates one images of a scene at time $t_2$.
Figure 9C:
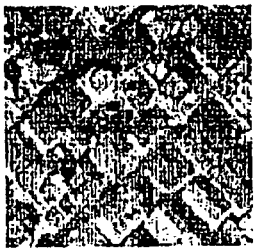
FIG. 9(c) shows all significant differences found between all pairs of images at times $t_1$ and $t_2$ for a window size of 29×29 (applied to a central region of the images).
Figure 9D:
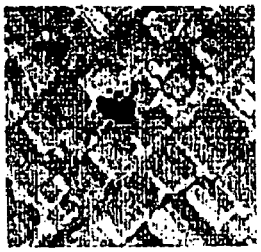
FIG. 9(d) shows the union of all significant differences found between matches derived from all pairs of images taken at time $t_1$ and all pairs of images taken at time $t_2$.

One of the common parameters in a traditional stereo algorithm is the window size. FIG. 7 presents one image from six urban scenes, where each scene comprised four images. FIG. 8(a) shows the merged scatter diagrams and FIG. 8(b) shows the global self-consistency distributions for all six scenes, for three window sizes (7×7, 15×15, and 29×29). Some of the observations to note from these experiments are as follows.

First, note that the scatter diagram for the 7×7 window of this class of scenes has many more outliers for scores below −1 than were found in the scatter diagram for the terrain scenes. This is reflected in the global self-consistency distribution in (b), where one can see that about 10% of matches have normalized distances greater than 6. The reason for this is that this type of scene has significant amounts of repeating structure along epipolar lines. Consequently, a score based only on the quality of fit between two windows (such as the MDL-based score) will fail on occasion. A better score would include a measure of the uniqueness of a match along the epipolar line as a second component.

Second, note that the number of outliers in both the scatter diagram and the self-consistency distributions decreases as window size decreases. Thus, large window sizes (in this case) produce more self-consistent results. But it also produces fewer points. This is probably because this stereo algorithm uses left-right/right-left equality as a form a self-consistency filter.

The matches as a function of window size have also been visually examined. When restricted to matches with scores below −1, it is observed that matches become sparser as window size increases. Furthermore, it appears that the matches are more accurate with larger window sizes. This is quite different from the results of Faugeras, et al. There it was found that, in general, matches became denser but less accurate as window size increased. It is believed that this is because an MDL score below −1 keeps only those matches for which the scene surface is approximately fronto-parallel within the extent of the window, which is a situation in which larger window sizes increases accuracy. This is borne out by visual observations of the matches. On the other hand, this result is basically in line with the results of Szeliski and Zabih, who show that prediction error decreases with window size.

6.5 DETECTING CHANGE

One application of the self-consistency distribution is detecting changes in a scene over time. Given two collections of images of a scene taken at two points in time, matches (from different times) can be compared that belong to the same surface element to see if the different in triangulated coordinates exceeds some significance level.

If restricted to surfaces that are well-modeled as a single-valued function of (x, y), such as terrain viewed from above, the task of finding a pair of matches that refers to the same surface element becomes straightforward: find a pair of matches whose world (x, y) coordinates are approximately the same. Using the larger of the scores of the two matches, the self-consistency distribution can be used to find the largest normalized difference that is expected, say, 99% of the time. This is the 99% significance level for detecting change. If the normalized difference exceeds this value, then the difference is due to a change in the terrain.

The significant differences have been computed for the first scene in FIG. 7, as illustrated in FIG. 9. FIG. 9(a) is one of 4 images of the scene at time $t_1$, FIG. 9(b) is one of six images of the scene at time $t_2$. Note the new buildings near the center of the image. FIG. 9(c) shows all significant differences found between all pairs of images at times $t_1$ and $t_2$ for a window size of 29×29 (applied to a central region of the images). FIG. 9(d) shows the union of all significant differences found between matches derived from all pairs of images taken at time to and all pairs of images taken at time $t_2$. The majority of the significant differences were found at the location of the new building.

Figure 10:
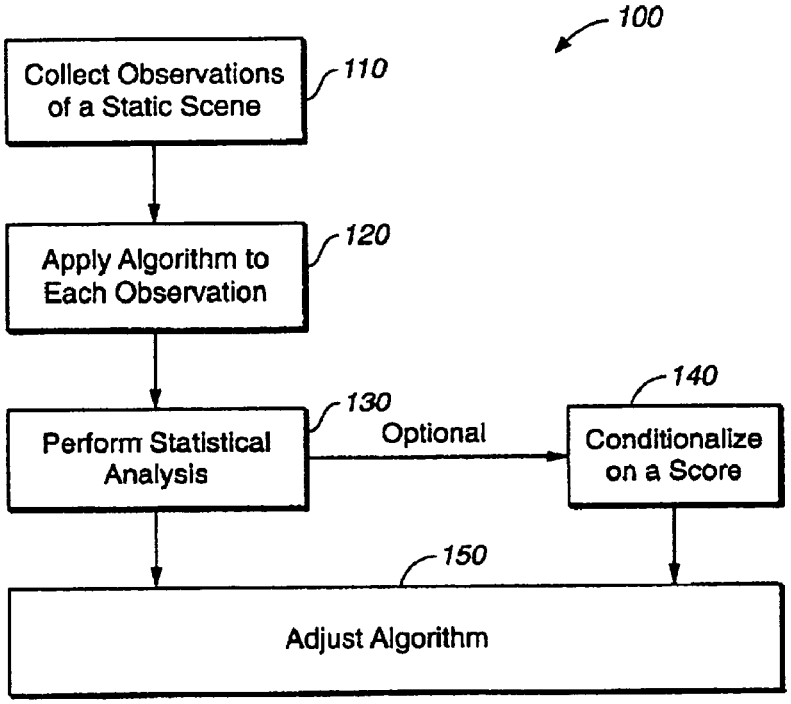
FIG. 10 is a flowchart showing the steps in a process for estimating the accuracy of inference algorithms using self-consistency methodology.

FIG. 10 is a block diagram of process 100 for estimating the accuracy of inference algorithms using self-consistency methodology.

In step 110 of process 100, a number of observations of a static scene are taken. An inference algorithm takes an observation as input and produces a set of hypotheses about the output. An observation is one or more images of a static scene taken at the same time and perhaps accompanied by metadata, such as the time the image(s) was acquired, the internal and external parameters, and their covariances. A hypothesis nominally refers to some aspect or element of the world (as opposed to some aspect of the observation), and it normally estimates some attribute of the element it refers to.

In one embodiment a fixed collection of images is taken at exactly the same time. In another embodiment a collection of images of a static scene is taken over time. Each image has a unique index and associated projection matrix and (optionally) projection covariances, which are supposed to be known. The projection matrix describes the projective linear relationship between the three-dimensional coordinates of a point in a common coordinate system, and its projection on an image. It should be appreciated that although the methodology is easier to apply when the coordinate system is Euclidean, the minimal requirement is that the set of projection matrices be a common projective coordinate system.

In step 120 of process 100, the inference algorithm is applied independently to each observation.

In step 130 of process 100, a statistical analysis is performed. For every pair of hypotheses for which the probability that the first hypothesis refers to the same object in the world as the second hypothesis is close to 1, a histogram is created. The histogram is incremented by a function of an estimate of some well-defined attribute of the referent of the hypothesis and by the covariance of the hypothesis. Optionally, as shown in step 140, the histogram may be conditionalized on a score.

In one embodiment, the resulting histogram (or self-consistency distribution) is an estimate of the reliability of the algorithm's hypotheses, optionally conditionalized by the score of the hypotheses.

In step 150 of process 100, the inference algorithm is adjusted according to the resulting histogram, to provide a more accurate and self-consistent inference algorithm.

Figure 20:
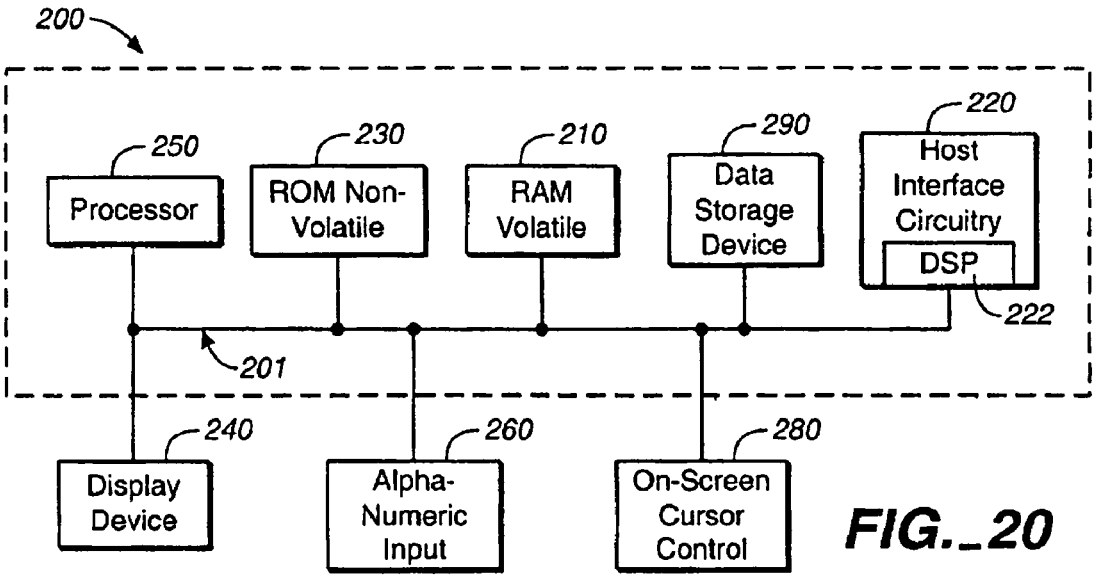
FIG. 20 is a block diagram of an exemplary computer system in accordance with one embodiment of the present invention.

FIG. 20 is a block diagram of one embodiment of device 200 for hosting a method for estimating an accuracy of an inference process in accordance with the present invention. In the present embodiment, device 200 is any type of intelligent electronic device (e.g., a desktop or laptop computer system, a portable computer system or personal digital assistant, a cell phone, a printer, a fax machine, etc.).

Continuing with reference to FIG. 20, device 200 includes an address/data bus 201 for communicating information, a central processor 250 coupled with the bus 201 for processing information and instructions, a volatile memory 210 (e.g., random access memory, RAM) coupled with the bus 201 for storing information and instructions for the central processor 250, and a non-volatile memory 230 (e.g., read only memory, ROM) coupled with the bus 201 for storing static information and instructions for the processor 250. Device 200 also includes an optional data storage device 290 (e.g., a memory stick) coupled with the bus 201 for storing information and instructions. Data storage device 290 can be removable. Device 200 also optionally contains a display device 240 coupled to the bus 201 for displaying information to the computer user.

In one embodiment, device 200 of FIG. 20 includes host interface circuitry 220 coupled to bus 201. Host interface circuitry 220 includes an optional digital signal processor (DSP) 222 for processing data to be transmitted or data that are received via a transceiver. Alternatively, processor 250 can perform some or all of the functions performed by DSP 222.

Also included in device 200 is an optional alphanumeric input device 260 that, in one implementation, is keyboard. Alphanumeric input device 260 can communicate information and command selections to processor 250 via bus 201.

Device 200 also includes an optional cursor control or directing device (on-screen cursor control 280) coupled to bus 201 for communicating user input information and command selections to processor 250. In one implementation, on-screen cursor control device 280 is a mouse or touchpad device incorporated with display device 240. On-screen cursor control device 280 is capable of registering a position on display device 240. The display device 240 utilized with device 200 may be a liquid crystal display (LCD) device, a cathode ray tube (CRT), a field emission display device (also called a flat panel CRT), or other display device suitable for generating graphic images and alphanumeric characters recognizable to the user.

A general formalization of a perceptual observation called self-consistency has been presented, and have proposed a methodology based on this formalization as a means of estimating the accuracy and reliability of point-correspondence algorithms, comparing different stereo algorithms, comparing different scoring functions, comparing window sizes, and detecting change over time. A detailed prescription for applying this methodology to multiple-image point-correspondence algorithms has been presented, without any need for ground truth or camera calibration, and have demonstrated it's utility in several experiments.

The self-consistency distribution is an idea that has powerful consequences. It can be used to compare algorithms, compare scoring functions, evaluate the performance of an algorithm across different classes of scenes, tune algorithm parameters (such as window size), reliably detect changes in a scene, and so forth. All of this can be done for little manual cost beyond the precise estimation of the camera parameters and perhaps manual inspection of the output of the algorithm on a few images to identify systematic biases.

The general self-consistency formalism developed in Section 2, which examines the self-consistency of an algorithm across independent experimental trials of different viewpoints of a static scene, can be used to assess the accuracy and reliability of algorithms dealing with a range of computer vision problems. This could lead to algorithms that can learn to be self-consistent over a wide range of scenes without the need for external training data or "ground truth."

II. DETECTING CHANGES IN 3-D SHAPE USING SELF-CONSISTENCY METHODOLOGY OR RESAMPLING THEORY

A method for reliably detecting change in the 3-D shape of objects that are well-modeled as single-value functions z=f(x, y) is presented. It uses an estimate of the accuracy of the 3-D models derived from a set of images taken simultaneously. This accuracy estimate is used to distinguish between significant and insignificant changes in 3-D models derived from different image sets. The accuracy of the 3-D model is estimated using a general methodology, called self-consistency, for estimating the accuracy of computer vision algorithms, which does not require prior establishment of "ground truth". A novel image-matching measure based on Minimum Description Length (MDL) theory allows for estimating the accuracy of individual elements of the 3-D model. Experiments to demonstrate the utility of the procedure are presented.

1. INTRODUCTION

Detecting where an object's 3-D shape has changed requires not only the ability to model shape from images taken at different times, but also the ability to distinguish significant from insignificant differences in the models derived from two image sets.

Presented is an approach to distinguishing significant from insignificant changes based on a novel methodology called self-consistency. This methodology allows for estimating, for a given 3-D reconstruction algorithm and class of scenes, the expected variation in the 3-D reconstruction of objects as a function of viewing geometry and local image-matching quality (referred to as a "score"). Differences between two 3-D reconstructions of an object that exceed this expected variation for a given significance level are deemed to be due to a change in the object's shape, while those below this are deemed to be due to uncertainty in the reconstructions.

The methodology for change detection presented is based on two simplifying assumptions. First, the specific class of objects that is used here is terrain (both urban and rural) viewed from above using aerial imagery. The terrain is modeled as a single function z=f(x, y), where z represented elevation above the ground plane and the (x, y) plane is tangent to the earth's surface. It should be appreciated that other classes of scenes can also be modeled in this manner. Second, it is assumed that all the camera parameters for all the images are known in a common coordinate system, which is obtained by bundle adjustment over all images. Together, these two assumptions reduce the problem of detecting changes in 3-D shape to that of finding point-by-point significant differences in scalar values.

2 THE SELF-CONSISTENCY METHODOLOGY OR RESAMPLING THEORY FOR CHANGE DETECTION

The self-consistency methodology can be used to automatically and reliably detect changes in terrain and/or buildings over time. The approach consists of several key steps. In brief, the steps are:

a) Collecting and controlling imagery of a site at different points in time. At least 2 overlapping images per point in time are required, although more images improves the accuracy and reliability.

b) Using 3-D reconstruction algorithms 3-D models of the site are created. There will typically be several models per site, one per pair of images taken at one point in time. These models are expected to be incomplete and partially incorrect. A "score" (such as the MDL-based score) is computed for each model element.

c) [Needed for step 4(a) only]. Applying steps 1 and 2 to a representative sample of sites and collecting statistics on the variation in model elevations at each ground coordinate, as a function of the score. Merging the statistics over all representative sites.

d) Applying step 2 to a site in question. For every ground coordinate, comparing the models derived at one point in time against the models derived at another point in time.

a) Using the statistics of step 3 to determine which ground coordinates have elevations that are statistically significantly different. This step can be used when there are as few as two images for each point in time.

b) Using resampling theory to compare the mean or median elevation for each ground coordinate (comparison of other statistics may also be useful). This requires at least 3 images per point in time, but is less reliable than (a) when there are fewer than about 5 images per point in time.

The major advantage in this approach is the statistical measurement of the reliability of a specific stereo algorithm applied to a specific class of scenes. This eliminates the need for ad hoc thresholds for detecting change.

This approach is useful for any company seeking to provide services to cities and other government agencies that need to know when significant changes have occurred over an area. Specific applications include: (a) automatically detecting changes in building height and/or shape or tax purposes, (b) automatically detecting changes in terrain after emergencies such as floods or earthquakes. This is also useful for any company currently selling satellite images that are seeking to provided "added value" to their current products (typically raw and rectified images). This technology can also be applied to the detection of changes in the 3-D shape of arbitrary objects that can be modeled as single-valued functions of (x, y), such as certain car parts.

Resampling theory is used to compare the mean or median elevation for each change in the models. Resampling theory is a more specialized application of change detection. It is useful, for example, when the scoring function does not segregate well between good and bad matches, but is acceptable for a specific scene. It should be noted that the comparison of other statistics may also be useful. The use of resampling theory requires at least 3 images per point in time. It should also be noted that resampling theory is less reliable than self-consistency methodology when there are fewer than about 5 images per point in time.

2.1 SELF-CONSISTENCY OF STEREO AND UNCERTAINTY

In order to distinguish significant from insignificant changes, it is necessary to have some kind of measure of the uncertainty of the algorithm output.

The self-consistency methodology makes it possible to measure the expected variation in the output of a computer vision algorithm as a function of viewing geometry and contextual measures, for a given algorithm and a given class of scenes. This expected variation can be expressed as a probability distribution that is called the self-consistency distribution. It is computed from sets of images by independent applications of the algorithm to subsets of images, and in particular does not require the knowledge of ground truth.

A stereo algorithm attempts to find matches consisting of a pair of points, one in each image, that both correspond to the same surface clement in the world. Though there are many variations on this theme, a typical stereo algorithm starts with a point in the first image. It searches for a matching point in the second image that maximizes some measure of the similarity of the image in the neighborhood of the two points (e.g. the score).

When the internal and external camera parameters (the full projection matrix for a pinhole camera) of a pair of images are known, given a match and the camera parameters, the 3-D coordinate of the surface element by triangulation can be estimated.

Consider the example of having several images of a static scene, all with known camera parameters. If the same stereo algorithm is applied to all pairs of images of this scene it is expected to get reconstructions that are quite similar in some places (where there is good texture and the surface is locally planar, for example) but quite different in others. The self-consistency distribution in this case is the distribution of differences in the triangulated 3-D coordinates for matches that belong to the same surface element, for all pairs of images of a given static scene. The key step in estimating this self-consistency distribution is identifying those matches from different image pairs for which the stereo algorithm is asserting belong to the same surface element.

In the application to terrain, the special form of the surface being estimated, $z=f(x, y)$, can be taken advantage of to find matches t at necessarily correspond to the same surface element. Namely, matches that are the same (x, y) coordinates for their 3-D triangulation correspond to the same surface element. The histogram of the differences between the z coordinates for such matches (appropriately normalized) is called the common-xy-coordinate self-consistency distribution. This distribution is also particularly appropriate for object-centered surface-reconstruction algorithms, such as the deformable meshes.

The normalization mentioned above divides the measured difference by its expected variance for the given camera parameters and an assumed variance of 1 pixel in match coordinates. Consequently, a normalized difference of 1 unit corresponds to a difference in disparity of about 1 pixel for that particular pair of images.

2.2. SUMMARIZING SELF-CONSISTENCY WITH THE MDL SCORE

It is desired to be able to compare a reconstruction of a scene created with as few as two images of the scene taken at time $t_1$ against a reconstruction of the same scene created with as few as two images taken at a different time, $t_2$. There is not enough data in these conditions to compute the self-consistency distribution. This difficulty is addressed by (a) computing self-consistency distributions as a function of a class of scenes and a particular algorithm, and (b) computing self-consistency as a function of an appropriate score.

For a sufficiently restrained class of scenes (such as the set of images of the rural scenes or the set of images of the urban area), the self-consistency distribution remains reasonably constant over many scenes taken at the same instant. The average of these distributions can be used to represent the self-consistency distribution of new images of a new scene within the same class.

Furthermore, this average distribution can be used to predict the expected variation in reconstruction when there is only a single image pair of a new scene within the same class. The idea is to use the score as a predictor of self-consistency. Since self-consistency is correlated with the quality of reconstruction, it is hoped that with a suitable score, the reconstructions will be similar for places where the match score was good and dissimilar otherwise. The use of a score which has this property is essential for the proposed change detection method to work.

The present invention uses a score based on Minimum Description Length (MDL) theory is used. It has a stronger correlation with self-consistency than other scores examined, in particular the SSD residual.

2.3. THE MDL-BASED SCORE

The problem with the traditional sum-of-squared-differences (SSD) score is that it is ambiguous. That is, a low SSD score can occur not only when the facet is correctly located (as expected), but also when the facet is incorrectly located and the terrain is spatially uniform.

Intuitively, then, what is wanted is an image-matching measure that is low only when the match between the predicted and observed pixel values is close and the pixel values form a sufficiently complex pattern that it is unlikely to be matched elsewhere.

The coding loss is a measure that satisfies this intuitive requirement. It is the difference between two different ways of encoding the pixels in the correlation windows. It is based on Minimum Description Length (MDL) theory. In MDL theory, quantized observations of a random process are encoded using a model of that process. This model is typically divided into two components: a parameterized predictor function M(z) and the residuals (differences) between the observations and the values predicted by that function. The residuals are typically encoded using an i.i.d. noise model. MDL is basically a methodology for computing the parameters z that yield the optimal lossless code length for this model and for a given encoding scheme.

Given N images (2 for stereo), let M be the number of pixels in the correlation window and let $g_i^j$ be the image gray level of the $i^{th}$ pixel observed in imaged For image j, the number of bits required to describe these gray levels depends on the model chosen. The simplest coding model, used here, is to encode the pixels as IID white noise. The encoding cost in this case can be approximated by:

$$C_j = M\cdot(\log \sigma_j + c)$$

where $\sigma_j$ is the measured variance of the $\{g_i^j\}_{1<i\leq N}$ and $c=\frac{1}{2}\log(2\pi e)$.

Alternatively, these gray levels can be expressed in terms of the mean gray level $\bar{g}_i$ across images and the deviations $(g_i^j-\bar{g}_i)$ from this average in each individual image. The cost of describing the means, can be approximated by $$\bar{C} = M\cdot(\log \bar{\sigma} + c)$$

where $\bar{\sigma}$ is the measured variance of the mean gray levels. Similarly the coding length of describing deviations from the mean is given by $$C_j^d = M\cdot(\log \sigma_j^d + c)$$

where $\sigma_j^d$ is the measured variance of those deviations in image j. Note that, because the mean is described across the images, only N−1 of the $C_j^d$ need by described. The description of the $N^{th}$ one is implicit.

The MDL score is the difference between these two coding lengths, normalized by the number of samples, that is $$\text{Score} = \bar{C} + \sum_{1\leq j\leq N-1} C_j^d - \sum_{1\leq j\leq N} C_j$$

When there is a good match between images, the $\{g_i^j\}_{1<i\leq N}$ have a small variance. Consequently the $C_j^d$ should be small, $\bar{C}$ should be approximately equal to any of the $C_j$ and Score should be negative. However, $C_j$ can only be strongly negative if these costs are large enough, that is, if there is enough texture for a reliable match.

2.4. THE CHANGE DETECTION ALGORITHM

In the first stage, the stereo algorithm is run on a large number of subsets of images of the same class as those in which it is desired to perform change detection. A bucketing method is used to find all the common-xy-coordinate matches (pairs of matches for which the 3-D reconstruction as the same (x, y) value with in a threshold). Each such pair is accumulated in a scatter diagram (see FIG. 11(a)) in which the x-coordinate of is the larger of the scores for the two matches, and the y-coordinate is the normalized difference between their triangulated z coordinates.

Then the significance level curves are extracted for the values of significance s% (e.g. percent confidence in the significance of the change). For a given value of the score (the x-axis), this is the normalized difference below which s% of the common-xy-coordinate match pairs with that score lie.

In the second stage, the pre-computed significance level curves are used to judge w ether a pair of matches derived from images taken at different times is significantly different. Using the same technique as before, the common-xy-coordinate matches are found where each match originates from a different instant, the larger of their scores is computed and the normalized difference between triangulated z coordinates is calculated.

If, for that score, this distance is above the significance level s% then the pair of matches is deemed to be a difference significant with confidence s%.

3. EXPERIMENTAL RESULTS 3.1. SELF-CONSISTENCY DISTRIBUTIONS

FIG. 11 illustrates several representations of the common-xy-coordinate self-consistency distribution. The distribution was derived from the application of the point-by-point stereo algorithm to 17 rural scenes, each consisting of 5 aerial images, for a total of 17*10=170 image pairs. The images ad a ground resolution of approximately 15 cm.

Figure 11A:
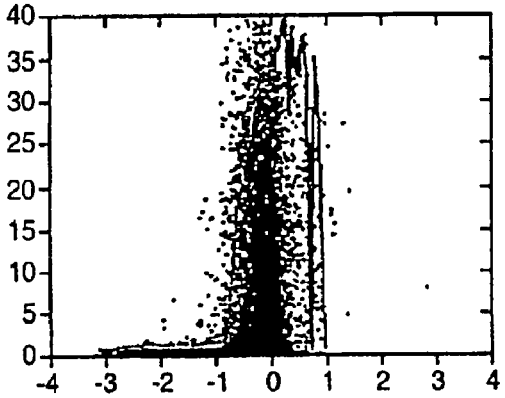
FIG. 11(a) illustrates a scatter diagram for 170 image pairs of rural scenes.
Figure 11B:
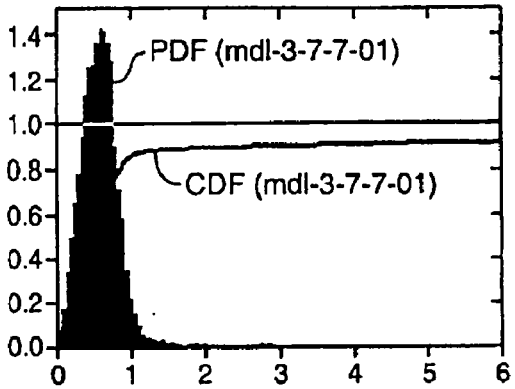
FIG. 11(b) illustrates a histogram of the normalized difference in the z coordinate of the triangulation of all common-xy-coordinate match pairs.

The bar graph of FIG. 11(b) is the histogram of the normalized difference in the z coordinate of the triangulation of all common-xy-coordinate match pairs. It can be seen from this histogram that the mode of the differences is about 1 normalized unit. The curve is the integral of this graph, or the cumulative distribution function. It can be seen from this that about 90% of the match pairs have normalized z differences below 2 units.

Each point in FIG. 11(a) corresponds to a common-xy-coordinate match pair. The x-coordinate of the point in the diagram is the larger of the scores for the two matches, and the y-coordinate is the normalized difference between their triangulated z coordinates. The curve in FIG. 11(a) is the 99% significance level. Note that significance level increases as the score increases, indicating that matches with larger scores are less self-consistent than matches with a lower score, an indication of the quality of the MDL score. The drop that observed for positive values of the score is due to the fact that there are only few common-xy-coordinate match pairs with positive scores, so that calculations done with those values are not statistically meaningful.

Figure 12A:
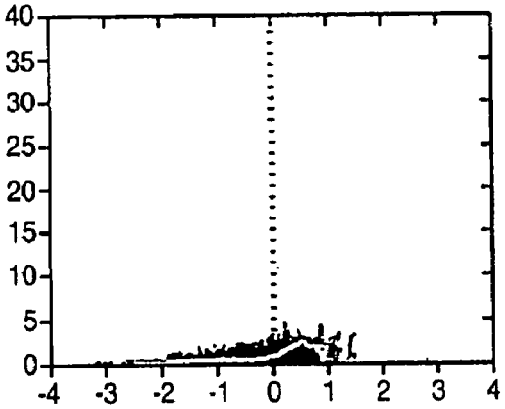
FIG. 12(a) illustrates a graphical representation of a scatter diagram.
Figure 12B:
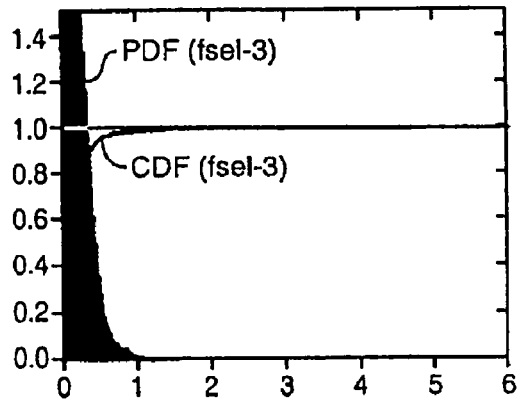
FIG. 12(b) illustrates a graphical representation of a histogram.

FIG. 12 illustrates the common-xy-coordinate self-consistency distribution for the deformable mesh algorithm applied to the same images. Note that it is significantly more self-consistent than the distribution for the stereo algorithm. This is as expected, since the deformable mesh algorithm was specifically designed to provide highly accurate reconstructions of terrain.

Figure 14A:
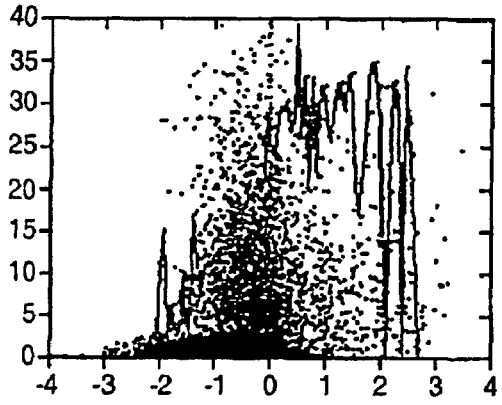
FIG. 14(a) illustrates a graphical representation of a scatter diagram.
Figure 14B:
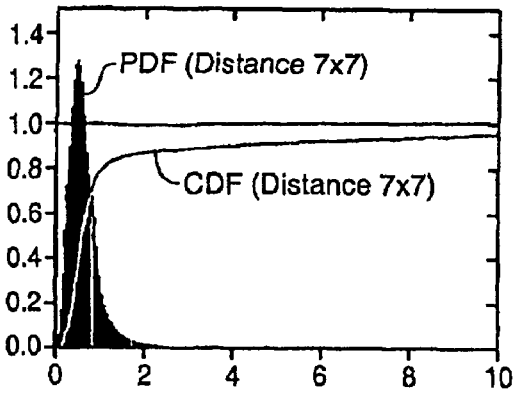
FIG. 14(b) illustrates a graphical representation of a histogram.

FIG. 14 illustrates the common-xy-coordinate self-consistency distribution for the stereo algorithm, with a correlation-window size of 7×7 pixels, applied to 6 urban scenes, each consisting of 4 images (a total of 6*6=36 image pairs) at a ground resolution of approximately 50 cm. Note that the cumulative distribution indicates that about 90% of the match pairs have a normalized difference below 2 units.

Figure 15A:
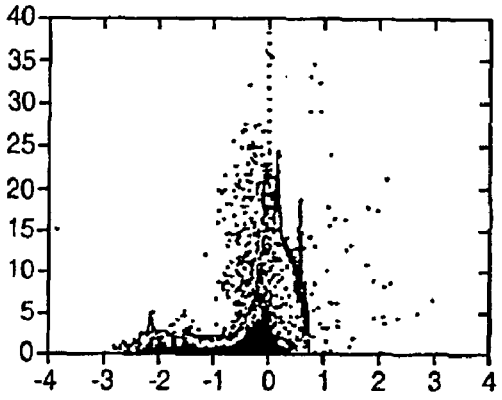
FIG. 15(a) illustrates a graphical representation of a scatter diagram.
Figure 15B:
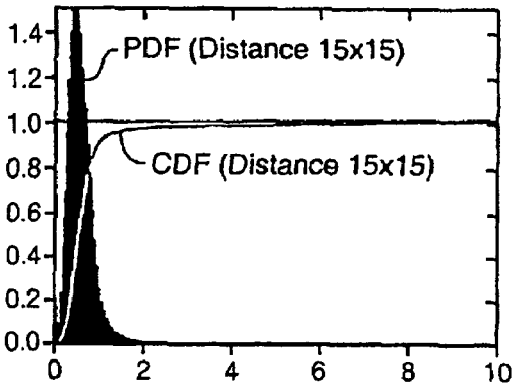
FIG. 15(b) illustrates a graphical representation of a histogram.
Figure 16A:
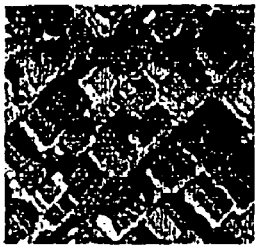
FIG. 16(a) shows one of 4 images taken at time 1
Figure 16B:
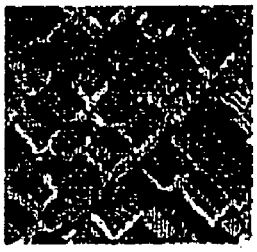
FIG. 16(b) shows one of the images taken at time 2.
Figure 16C:
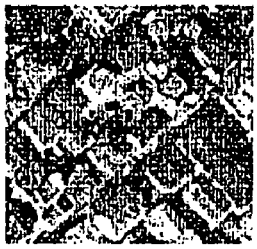
FIG. 16(c) shows the significant differences between the matches derived from a single pair of images taken at time 1 and the matches derived from a single pair of images taken at time 2.
Figure 16D:
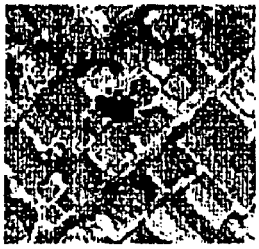
FIG. 16(d) shows the merger of the significant differences between each pair of images at time 1 and each pair of images at time 2.

FIG. 15 shows the distribution for the same algorithm, but using 15×15 image windows. Note that the cumulative distribution indicates that a much higher percentage, about 98%, of the match pair have a normalized difference below 2 units.

Note also that the significance level is, overall, higher than for the rural scenes. This is because there are many repeating structures in rural scenes. Thus, a score based purely on the similarity of image windows cannot always distinguish between good and bad matches. However, it is seen that larger window sizes allow the score to distinguish good from bad matches more often.

3.2. CHANGE DETENTION RESULTS

Figure 13C:
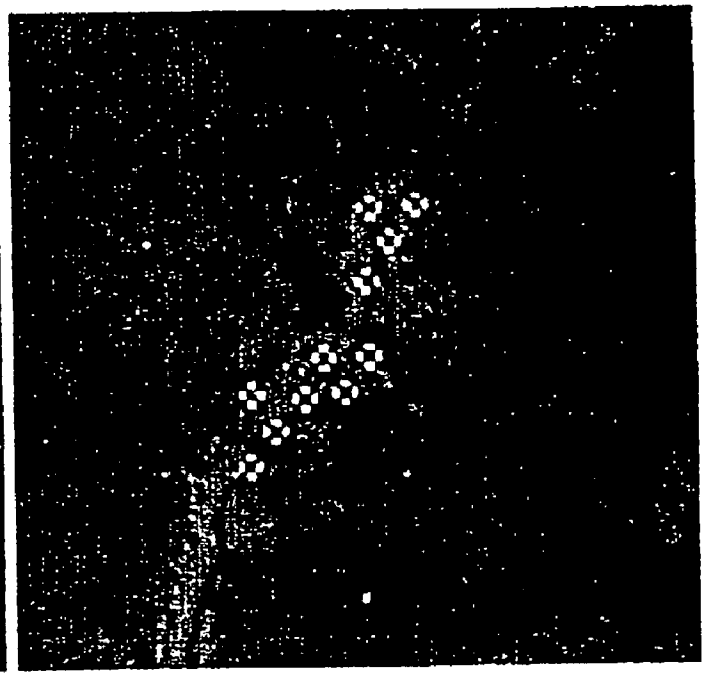
FIG. 13(c) illustrates an image where vertices that were deemed to be significantly are overlaid as white cross on the image in which is a magnified view of the dried creek bed of FIG. 13(a).
Figure 13B:
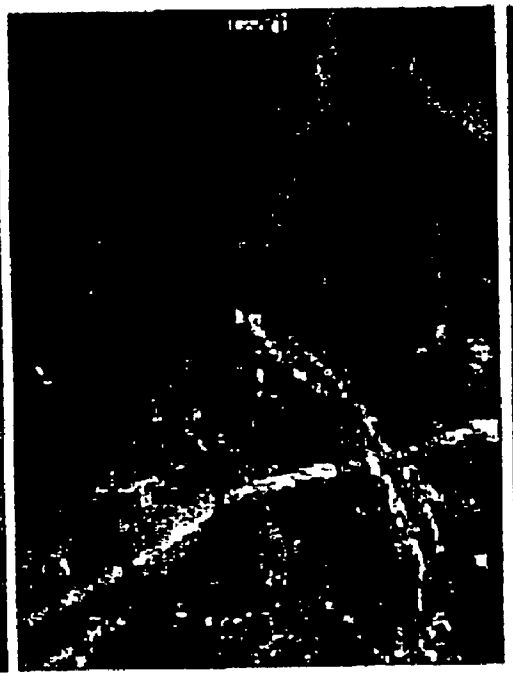
FIG. 13(b) illustrates one of 5 images of a scene taken in 1998.
Figure 13A:
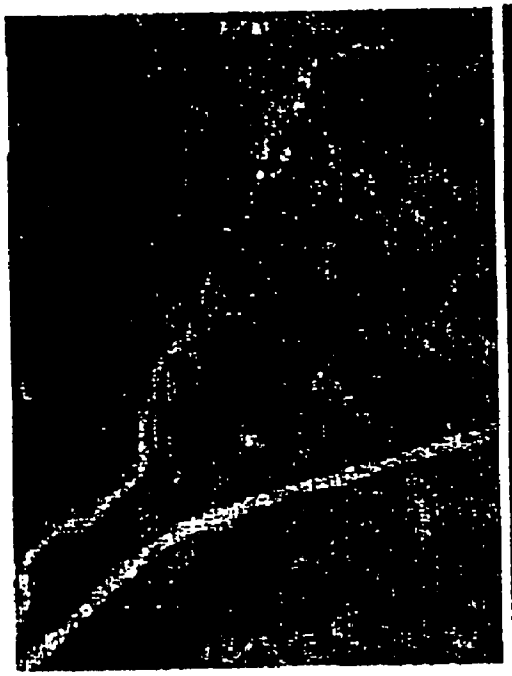
FIG. 13(a) illustrates one of 5 images of a scene taken in 1995.

FIG. 13 shows the changes detected in one of the rural scenes mentioned above, using the deformable mesh algorithm. FIG. 13(a) illustrates one of 5 images of the scene taken in 1995. The dark diagonal near the center of the image is a dried creek bed. FIG. 13(b) shows one of 5 images of the same area taken in 1998. The dried creek bed as been filled in with dirt, creating a change in elevation of about 1 meter. The deformable mesh algorithm is applied to one pair of images taken in 1995. This is then compared to the deformable mesh derived from one pair of images taken in 1998. Vertices that were deemed to be significantly different (above the 99% level of the self-consistency distribution of FIG. 12(a)), are overlaid as white cross on the image in FIG. 13(c), which is a magnified view of the dried creek bed of FIG. 13(a).

The algorithm has also been applied to forested areas of the same rural scene. Although the normalized differences in z-coordinates is sometimes much larger (10 meters), no changes were deemed significant. Indeed, it is known that the mesh algorithm performs poorly on images of tree canopies, so that reconstruction noise could account for the differences.

FIG. 16 shows the changes (significant differences in z) detected in one of the urban scenes mentioned above, but this time using the stereo algorithm with 15×15 windows. FIG. 16(a) shows one of 4 images taken at time 1. Note the new building near the center of the image. FIG. 16(b) shows one of the images taken at time 2. FIG. 16(c) shows the significant differences between the matches derived from a single pair of images taken at time 1 and the matches derived from a single pair of images taken at time 2, for a significance level of 99.99%. FIG. 16(d) shows the merger of the significant differences between each pair of images at time 1 and each pair of images at time 2. Note that virtually all differences are at the location of the new building.

Figure 17A:
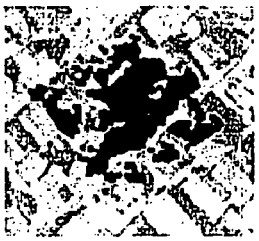
FIG. 17(a) shows the differences between a single pair of images at time 1 and a single pair of images at time 2, for a threshold of 3 units.
Figure 17B:
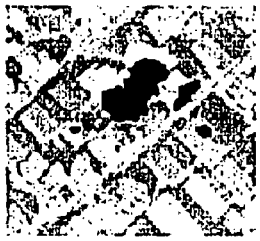
FIG. 17(b) shows the differences for a threshold of 6 units, which is the average difference detected in FIG. 14.
Figure 17C:
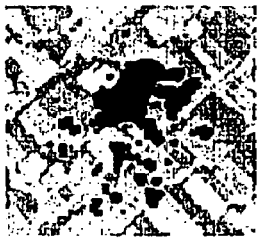
FIG. 17(c) illustrates the union of the differences for all image pairs.

For comparison, it is shown what would happen if the normalized difference in triangulated z coordinates were simply thresholded. FIG. 17(a) shows the differences between a single pair of images at time 1 and a single pair of images at time 2, for a threshold of 3 units. FIG. 17(b) shows the differences for a threshold of 6 units, which is the average difference detected in FIG. 14. This value of the threshold is the highest one for which no correct changes are missed, yet it is seen that many incorrect changes are still detected. In FIG. 17(c) illustrates the union of the differences for all image pairs.

Figure 18A:
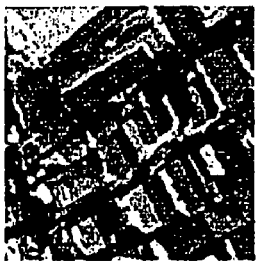
FIG. 18 illustrates the results of change detection an urban scene with a new building.
Figure 18B:
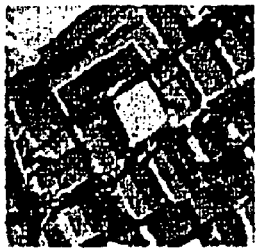
Figure 18C:
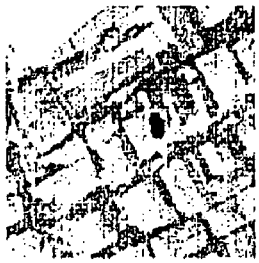
Figure 19A:
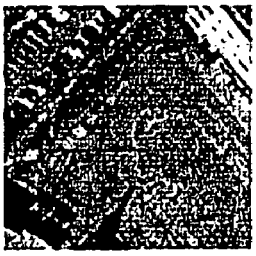
FIG. 19 illustrates the results of change detection for an urban scene without significant changes.
Figure 19B:
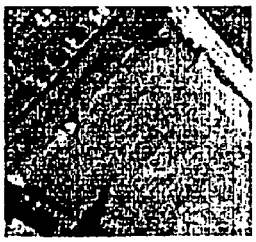
Figure 19C:
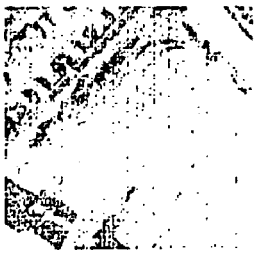

In FIGS. 18 and 19 illustrate the results of change detection for two other urban scenes, one with a new building, the other without significant changes.

Figure 21:
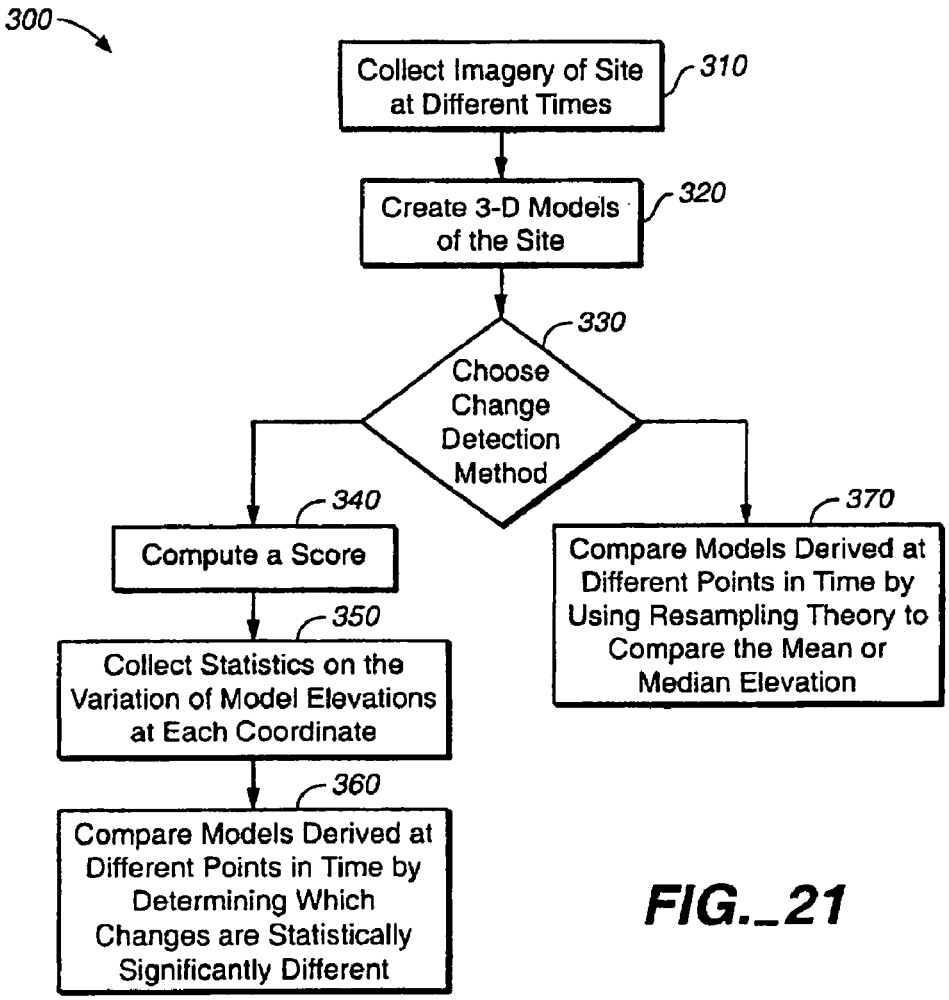
FIG. 21 is a flowchart showing the steps in a process for detecting changes in the 3-D shape of terrain and/or buildings from aerial or satellite images using self-consistency methodology.

FIG. 21 is a flowchart showing the steps in a process 300 for detecting changes in 3-D shape using self-consistency methodology or resampling theory.

In step 310 of process 300, a number of images at different points in time are collected. It should be appreciated that the images can be of any 3-D object or landscape. Apart from being 3-D, the subject matter of image is not intended to be limited in any way. A plurality of overlapping images per point in time are required, although more images improves the accuracy and reliability.

In step 320 of process 300, using 3-D reconstruction algorithms 3-D models of the images are created. There will typically be several models per site, one per pair of images taken at one point in time. These models are expected to be incomplete and partially incorrect.

In step 330 of process 300, the user determines whether to analyze the collected images by self-consistency methodology or by resampling theory. Steps 340 to 360 of process 300 represent the use of self-consistency methodology to detect changes in 3-D shape. Step 370 represents the resampling theory.

In step 340 of process 300, a "score" (e.g. the MDL-based score, see Part II, Section 2.3, supra) is computed for each model element. The score is an estimate of the confidence of the accuracy of the 3-D reconstruction algorithms.

In step 350 of process 300, a statistical analysis on the 3-D models is performed. Statistics are collected on the variation in model elevations, as a function of the score. The statistics are merged over all representative images.

In step 360 of process 300, the models derived at one point in time are compared against the models derived at another point in time. Using the statistics of step 350, it is determined which changes in the models are statistically significantly different. In one embodiment this step can be used when there are as few as two images for each point in time.

In step 370 of process 300, the resampling theory is used to compare the mean or median elevation for each change in the models. It should be noted that the comparison of other statistics may also be useful. The use of the resampling theory requires at least 3 images per point in time. It should also be noted that resampling theory is less reliable than self-consistency methodology when there are fewer than about 5 images per point in time.

The self-consistency methodology has been extended to deal with varying scenes, resulting in a reliable and robust method for detection of changes in 3-D shape. The components include: a new image-matching measure called the coding loss; a novel framework for estimating the accuracy and reliability of shape modeling procedures, applicable to other stereo reconstruction procedures; a method for normalizing the effects of camera parameters and their covariances; and a procedure for applying the self-consistency framework. This framework could be used with other 3-D attributes.

The experimental results based on the above framework are promising. The framework has been applied to reliably detect quite small changes in terrain (some corresponding to less than a pixel in disparity) in rural scenes using a deformable mesh algorithm, and large changes in urban scenes, which are quite difficult because of occlusions, using a traditional stereo algorithm.

The preferred embodiments of the present invention are thus described. While the present invention has been described in particular embodiments, it should be appreciated that the present invention should not be construed as limited by such embodiments, but rather construed by the claims below.

What is claimed is:

1. A method for estimating an accuracy of an inference process, said method comprising the steps of:

a) collecting a plurality of observations of a scene, wherein said scene is within a class of scenes and observational conditions;

b) applying said inference process to each observation of said scene;

c) measuring a self-consistency of said inference process by comparing a plurality of hypotheses of said inference process as a function of a nature of said observation; and d) for a plurality of hypotheses of said scene, incrementing a histogram of a function of an estimate of an attribute of a hypothesis of said scene, said hypothesis normalized by the function of said estimate, resulting in a statistical analysis of the self-consistency of said inference process.

2. The method as recited in claim 1 wherein said scene is a static scene.

3. The method as recited in claim 1 wherein step d) comprises the step of d1) conditionalizing said histogram on a score, said score being an appraisal of the confidence of the accuracy of said estimate.

4. The method as recited in claim 3 further comprising the step of:

e) adjusting the internal parameters of said inference process based on said statistical analysis.

5. The method as recited in claim 3 further comprising the step of:

e) comparing different inference processes based on said statistical analysis.

6. The method as recited in claim 1 further comprising the step of:

e) adjusting the internal parameters of said inference process based on said statistical analysis.

7. The method as recited in claim 1 further comprising the step of:

e) comparing different inference processes based on said statistical analysis.

8. A computer-readable medium having stored thereon instructions for causing a computer to implement a process for estimating an accuracy of an inference process to perform the steps of:

a) collecting a plurality of observations of a scene, wherein said scene is within a class of scenes and observational conditions;

b) applying said inference process to each observation of said scene;

c) measuring a self-consistency of said inference process by comparing a plurality of hypotheses of said inference process as a function of a nature of said observation; and d) for a plurality of hypotheses of said scene, incrementing a histogram of a function of an estimate of an attribute of a hypothesis of said scene, said hypothesis normalized by the function of said estimate, resulting in a statistical analysis of the self-consistency of said inference process.

9. The computer-readable medium of claim 8 wherein said scene is a static scene.

10. The computer-readable medium of claim 8 wherein said instructions therein causes a computer to perform the step of:

d1) conditionalizing said histogram on a score, said score being an appraisal of the confidence of the accuracy of said estimate.

11. The computer-readable medium of claim 10 wherein said instructions therein causes a computer to perform the step of:

e) adjusting the internal parameters of said inference process based on said statistical analysis.

12. The computer-readable medium of claim 10 wherein said instructions therein causes a computer to perform the step of:

e) comparing different inference processes based on said statistical analysis.

13. The computer-readable medium of claim 8 wherein said instructions therein causes a computer to perform the step of:

e) adjusting the internal parameters of said inference process based on said statistical analysis.

14. The computer-readable medium of claim 8 wherein said instructions therein causes a computer to perform the step of:

e) comparing different inference processes based on said statistical analysis.

15. An computer system comprising:

a bus;

a processor coupled to said bus; and a computer-readable memory unit coupled to said bus;

said processor for performing a method for estimating an accuracy of an inference process, said method comprising the steps of:

a) collecting a plurality of observations of a scene, wherein said scene is within a class of scenes and observational conditions;

b) applying said inference process to each observation of said scene;

c) measuring a self-consistency of said inference process by comparing a plurality of hypotheses of said inference process as a function of a nature of said observation; and d) for a plurality of hypotheses of said scene, incrementing a histogram of a function of an estimate of an attribute of a hypothesis of said scene, said hypothesis normalized by the function of said estimate, resulting in a statistical analysis of the self-consistency of said inference process.

16. The computer system of claim 15, wherein said scene is a static scene.

17. The computer system of claim 15 wherein said processor performs said method for estimating an accuracy of an inference process, further comprising the step of:

d1) conditionalizing said histogram on a score, said score being an appraisal of the confidence of the accuracy of said estimate.

18. The computer system of claim 17 wherein said processor performs said method for estimating an accuracy of an inference process, further comprising the step of:

e) adjusting the internal parameters of said inference process based on said statistical analysis.

19. The computer system of claim 17 wherein said processor performs said method for estimating an accuracy of an inference process, further comprising the step of:

e) comparing different inference processes based on said statistical analysis.

20. The computer system of claim 15 wherein said processor performs said method for estimating an accuracy of an inference process, further comprising the step of:

e) adjusting the internal parameters of said inference process based on said statistical analysis.

21. The computer system of claim 15 wherein said processor performs said method for estimating an accuracy of an inference process, further comprising the step of:

e) comparing different inference processes based on said statistical analysis.

*22. A computing device for estimating an accuracy of an inference process, wherein the computing device comprises a processor and a memory, wherein the computing device is configured to:*

*collect a plurality of observations of a scene;*

*apply an inference process to each observation of the scene;*

*measure a self-consistency of the inference process; and*

*obtain a statistical analysis of the self-consistency of the inference process.*

*23. The computing device of claim 22, wherein the scene is within a class of scenes and observational conditions.*

*24. The computing device of claim 22, wherein measuring the self-consistency of the inference process comprises:*

*comparing a plurality of hypotheses of the inference process as a function of a nature of the observation.*

*25. The computing device of claim 22, wherein obtaining a statistical analysis of the self-consistency of the inference process comprises:*

*for a plurality of hypothesis of the scene, incrementing a histogram of a function of an estimate of an attribute of a histogram of the scene, the hypothesis normalized by the function of the estimate.*

*26. The computing device of claim 25, further configured to:*

*conditionalize the histogram on a score, wherein the score comprises an appraisal of the confidence of the accuracy of the estimate.*

*27. The computing device of claim 25, further configured to:*

*adjust the internal parameters of the inference process based on the statistical analysis.*

*28. The computing device of claim 25, further configured to:*

*compare different inference processes based on the statistical analysis.*

*29. The computing device of claim 22, further configured to:*

*adjust the internal parameters of the inference process based on the statistical analysis.*

*30. The computing device of claim 22, further configured to:*

*compare different inference processes based on the statistical analysis.*

*31. An apparatus, comprising:*

*means for collecting a plurality of observations of a scene;*

*means for applying an inference process to each observation of the scene;*

*means for measuring a self-consistency of the inference process; and*

*means for obtaining a statistical analysis of the self-consistency of the inference process.*

*32. The apparatus of claim 31, wherein the scene is within a class of scenes and observational conditions.*

*33. The apparatus of claim 31, wherein the means for measuring the self-consistency of the inference process comprises:*

*means for comparing a plurality of hypotheses of the inference process as a function of a nature of the observation.*

*34. The apparatus of claim 31, wherein means for obtaining a statistical analysis of the self-consistency of the inference process comprises:*

*for a plurality of hypotheses of the scene, means for incrementing a histogram of a function of an estimate of an attribute of a hypothesis of the scene, the hypothesis normalized by the function of the estimate.*

*35. The apparatus of claim 34, further comprising:*

*means for conditionalizing the histogram on a score, wherein the score comprises an appraisal of the confidence of the accuracy of the estimate.*

*36. The apparatus of claim 34, further comprising:*

*means for adjusting the internal parameters of the inference process based on the statistical analysis.*

*37. The apparatus of claim 34, further comprising:*

*means for comparing different inference processes based on the statistical analysis.*

*38. The apparatus of claim 31, further comprising:*

*means for adjusting the internal parameters of the inference process based on the statistical analysis.*

*39. The apparatus of claim 31, further comprising:*

*means for comparing different inference processes based on the statistical analysis.*

* * * * *

UNITED STATES PATENT AND TRADEMARK OFFICE

CERTIFICATE OF CORRECTION

PATENT NO. : RE42,999 E
APPLICATION NO. : 11/645331
DATED : December 6, 2011
INVENTOR(S) : LeClerc, deceased et al.

It is certified that error appears in the above-identified patent and that said Letters Patent is hereby corrected as shown below:

On the Face Page, in Field (75), under "Inventors", in Column 2, Line 1, delete "LeClerc," and insert -- LeClerc (Deceased), --, therefor.

In Column 1, Line 49, delete "aquiring" and insert -- acquiring --, therefor.

In Column 3, Line 11, delete "$t_1$" and insert -- $t_1$. --, therefor.

In Column 3, Line 48, delete "1" and insert -- 1. --, therefor.

In Column 4, Line 58, delete "that so" and insert -- that --, therefor.

In Column 5, Line 62, delete "Prob(Ref(h)" and insert -- Prob(Ref(h)) --, therefor.

In Column 6, Lines 14-15, delete
"$C(h, h')=R(h, h'(Att(h)–Att(h'))^{T}(Cov(h)+Cov(h')^{-1}(Att(h)–Att(h'))^{T}$" and
insert -- $C(h, h') = R(h, h')(Att(h) - Att(h'))^{T}(Cov(h) + Cov(h'))^{-1}(Att(h) - Att(h'))^{T}$. --, therefor.

In Column 6, Line 21, delete "(Ω(W) and H'=F(ΩC(h, h')(W)" and
insert -- (Ω(W)) and H'=F(ΩC(h, h')(W)) --, therefor.

In Column 7, Line 11, delete "methodology" and insert -- methodology. --, therefor.

In Column 7, Line 28, delete "I1" and insert -- $I_1$ --, therefor.

In Column 7, Line 40, delete "Atn(h)," and insert -- Att(h), --, therefor.

In Column 10, Line 25, delete "$(L^{T}L)^{31}{}_{1}L^{T}b$," and insert -- $(L^{T}L)^{-1}L^{T}b$, --, therefor.

In Column 10, Line 65, after Equation, insert -- . --.

Signed and Sealed this
Eighth Day of January, 2013

David J. Kappos

David J. Kappos
*Director of the United States Patent and Trademark Office*

In Column 11, Line 5, delete “a.” and insert -- σ. --, therefor.

In Column 11, Line 11, after Equation, insert -- . --.

In Column 11, Line 21, delete “UNNORALIZED” and insert -- UNNORMALIZED --, therefor.

In Column 14, Line 6, delete “to” and insert -- $t_1$ --, therefor.

In Column 15, Line 42, delete “it’s” and insert -- its --, therefor.

In Column 17, Line 29, delete “provided” and insert -- provide --, therefor.

In Column 17, Line 62, delete “clement” and insert -- element --, therefor.

In Column 19, Line 27, delete “in imaged” and insert -- in image j. --, therefor.

In Column 19, Line 55, after Equation, insert -- . --.

In Column 23, Line 13, in Claim 3, delete “step of” and insert -- step of: --, therefor.

In Column 24, Line 14, in Claim 15, delete “An” and insert -- A --, therefor.